US00RE36381E

United States Patent [19]

Boyle et al.

[11] E Patent Number: Re. 36,381

[45] Reissued Date of Patent: Nov. 9, 1999

[54] PORTABLE COMPUTER AND DOCKING STATION HAVING AN ELECTROMECHANICAL DOCKING/ UNDOCKING MECHANISM AND A PLURALITY OF COOPERATIVELY INTERACTING FAILSAFE MECHANISMS

[75] Inventors: Dennis J. Boyle, Palo Alto; Matt Herron, Menlo Park; David Blakely, Mountain View; Mary Johnson, San Jose; James J. Halicho, Sunnyvale; Brian Howard, Menlo Park, all of Calif.

[73] Assignee: Apple Computer, Inc., Cupertino, Calif.

[21] Appl. No.: 08/444,085

[22] Filed: May 17, 1995

Related U.S. Patent Documents

Reissue of:

[64] Patent No.: 5,323,291
Issued: Jun. 21, 1994
Appl. No.: 07/961,232
Filed: Oct. 15, 1992

[51] Int. Cl.[6] ..... G06F 1/16; G06F 3/00; G06F 13/00; H05K 7/12

[52] U.S. Cl. ..... 361/686; 395/282; 395/500

[58] Field of Search ..... 364/708.1; 312/223.1, 312/223.2; 361/606–609, 679, 683–686, 725–727, 754, 759, 798

[56] References Cited

U.S. PATENT DOCUMENTS

| | | | |
|---|---|---|---|
| 4,654,818 | 3/1987 | Wetterau, Jr. . | |
| 4,742,478 | 5/1988 | Nigro, Jr. et al. | 364/708.1 X |
| 4,769,764 | 9/1988 | Levanon | 364/708.1 X |
| 4,788,658 | 11/1988 | Hanebuth . | |
| 4,903,222 | 2/1990 | Carter et al. . | |
| 4,969,830 | 11/1990 | Daly et al. | 361/686 X |
| 5,030,128 | 7/1991 | Herron et al. . | |
| 5,041,924 | 8/1991 | Blackborow et al. | 361/685 X |
| 5,107,400 | 4/1992 | Kobayashi . | |
| 5,117,378 | 5/1992 | Ho . | |
| 5,126,954 | 6/1992 | Morita . | |
| 5,159,533 | 10/1992 | Kuang . | |
| 5,175,671 | 12/1992 | Sasaki | 361/686 |
| 5,186,646 | 2/1993 | Pederson . | |
| 5,192,222 | 3/1993 | Krause et al. . | |
| 5,199,888 | 4/1993 | Condra et al. | 361/683 X |
| 5,212,605 | 5/1993 | Lim et al. . | |
| 5,214,574 | 5/1993 | Chang . | |
| 5,313,596 | 5/1994 | Swindler et al. | 364/708.1 X |
| 5,323,291 | 6/1994 | Boyle et al. | 361/683 |

*Primary Examiner*—Michael W. Phillips
*Attorney, Agent, or Firm*—Beyer & Weaver, LLP.

[57] ABSTRACT

A first embodiment of the present invention comprises a fully functional portable computer with central processing unit, hard disk drive data storage, and liquid crystal display and a docking station having at least a floppy disk drive, video random access memory and video controller. A motorized docking/undocking mechanism automatically docks and undocks the portable computer and docking station after the user has inserted the portable computer into the docking station or after the user has requested that the units be undocked. Numerous mechanical and electrical safeguards prevent the docking or undocking of the units if such docking or undocking is likely to lead to the loss of data or damage to the components of either unit. The internal mechanical construction of the docking station allows the user to place a large cathode ray tube display monitor directly atop the docking station without hindering the docking or undocking of the portable computer.

56 Claims, 20 Drawing Sheets

PORTABLE COMPUTER AND DOCKING STATION HAVING AN ELECTROMECHANICAL DOCKING/ UNDOCKING MECHANISM AND A PLURALITY OF COOPERATIVELY INTERACTING FAILSAFE MECHANISMS

Matter enclosed in heavy brackets [ ] appears in the original patent but forms no part of this reissue specification; matter printed in italics indicates the additions made by reissue.

BACKGROUND OF THE INVENTION

This invention is in the field of portable computers and docking stations for portable computers.

Portable computers are known. Indeed, they comprise the fastest growing segment of the computer market, as more and more people, having come to rely on the capabilities of their desktop computer to increase their productivity, desire the same capabilities when they travel as they do when they are at work.

Although the capabilities of many portable computers closely match those of larger desktop machines, the expense of purchasing a second computer in addition to a desktop machine is difficult for many people to justify. Indeed, there is something inherently wasteful in having two different machines, each functionally nearly identical. In particular, most owners use only one of the machines at any given time. The other machine sits idle. In effect, the user owns two central processing units ("CPU"s), only one of which is operating at a time.

The dilemma posed to a consumer who desires the portability of a notebook computer and the full functionality of a desktop computer without the need of purchasing two separate systems has been recognized by the computer industry. One known solution is to offer a fully capable portable notebook computer which can be coupled to a separate stationary unit, the stationary unit frequently having additional data storage such as disk drives and additional display capabilities. These stationary units are commonly known as "docking stations".

Although the concept of a portable computer/docking station is an excellent one, as it eliminates the duplication of the CPU and greatly increases the ease with which data can be transferred from the portable computer to the desktop environment and vice versa, known embodiments of this concept have suffered from very poor implementation.

In some known portable computer/docking station systems, the method of coupling the portable computer to the docking station uses an extremely clumsy mechanical system which relies on user knowledge and skill to mate the computer and docking station successfully. Examples include latch systems where the computer owner must carefully align the connectors before mating the computer to the docking station. Even after the machines have been coupled together, the security of the latching mechanism is suspect. Also, these systems do not appear to be sufficiently durable to last for an acceptable period of time.

The manner that screen displays integrate with known docking stations is also less than ideal. Typically the screen must remain separate from the docking station, as the portable computer itself forms the top surface of the two units when they are docked together. This increase in the "footprint" of the system is certainly undesirable.

Most importantly, the electrical interface between the docking station and the portable computer is usually very crude. Unless the user follows a carefully prescribed set of instructions, the system crashes during either docking or undocking, resulting in a loss of data and possible damage to the components of either the docking station, the computer, or both. Even if the user carefully follows the instructions and completes a successful docking, the units must still be coupled to all external networks, peripherals and a power supply. Completing such connections is time consuming and prone to error.

In these systems, if undocking is commanded while in an application, the undocking occurs, but the system crashes and data is lost.

There thus remains a need for a fully functional portable computer that can be easily coupled to a docking station, the docking station offering increased data storage and increased video capabilities. The docking process itself should be completely transparent to the system's user, allowing docking and undocking to proceed with a minimum of user input and with many safeguards protecting the data and components in both units from accidental or even intentional misuse. It should also be possible for owners of a portable computer/docking station to use their portable computer with other docking stations without the need for extensive system reconfiguration.

SUMMARY OF THE INVENTION

In its first embodiment, the present invention comprises a portable computer with a liquid crystal display ("LCD"), hard disk drive storage, CPU and other supporting electronics and a docking station to which the portable computer can be coupled. Docking is accomplished by an electromechanical mating system which ensures reliable interconnection through a plurality of mechanical and electrical interlocks which prevent docking or undocking if certain conditions do not exist and which insure that docking will be accomplished in a simple and repeatable fashion if these prerequisites do exist.

The docking station is configured so that a large CRT display may be rested thereon without damaging the docking station or in any way impeding its functioning. The docking station initially comprises at least additional video-memory and a floppy disk drive, as well as such input/output ("I/O") resources as video, sound, SCSI, etc. Providing these resources in the docking station allows the construction of a very small and lightweight portable computer. A floating point arithmetic co-processor can also be added to the docking station. Additional subsystems such as I/O bus subsystems compatible with the NUBUS® bus architecture and protocol established by Texas instruments. (NUBUS is a registered trademark owned by Texas Instruments) cards having a plurality of different functions and a hard disk drive storage unit can be added.

As the docking station is usually kept in one location, it remains coupled to local area networks, the telephone system, peripherals and an AC power source. As soon as docking is complete, the user can instantly access any of these resources without additional user configuration or effort.

Security systems are provided which permit the user to lock the portable computer in or out of the docking station and to lock the docking station in place.

The present invention will now be described in detail with reference to the figures which are listed and described below.

BRIEF DESCRIPTION OF THE ILLUSTRATIONS

DETAILED DESCRIPTION OF THE PREFERRED EMBODIMENT

A first preferred embodiment of the present invention comprises at least a portable computer 100 and a docking station 500. These will first be described separately in detail. Then those aspects of both the computer and docking station which relate to their operating as a unit will be described.

PORTABLE COMPUTER

Figure 1:
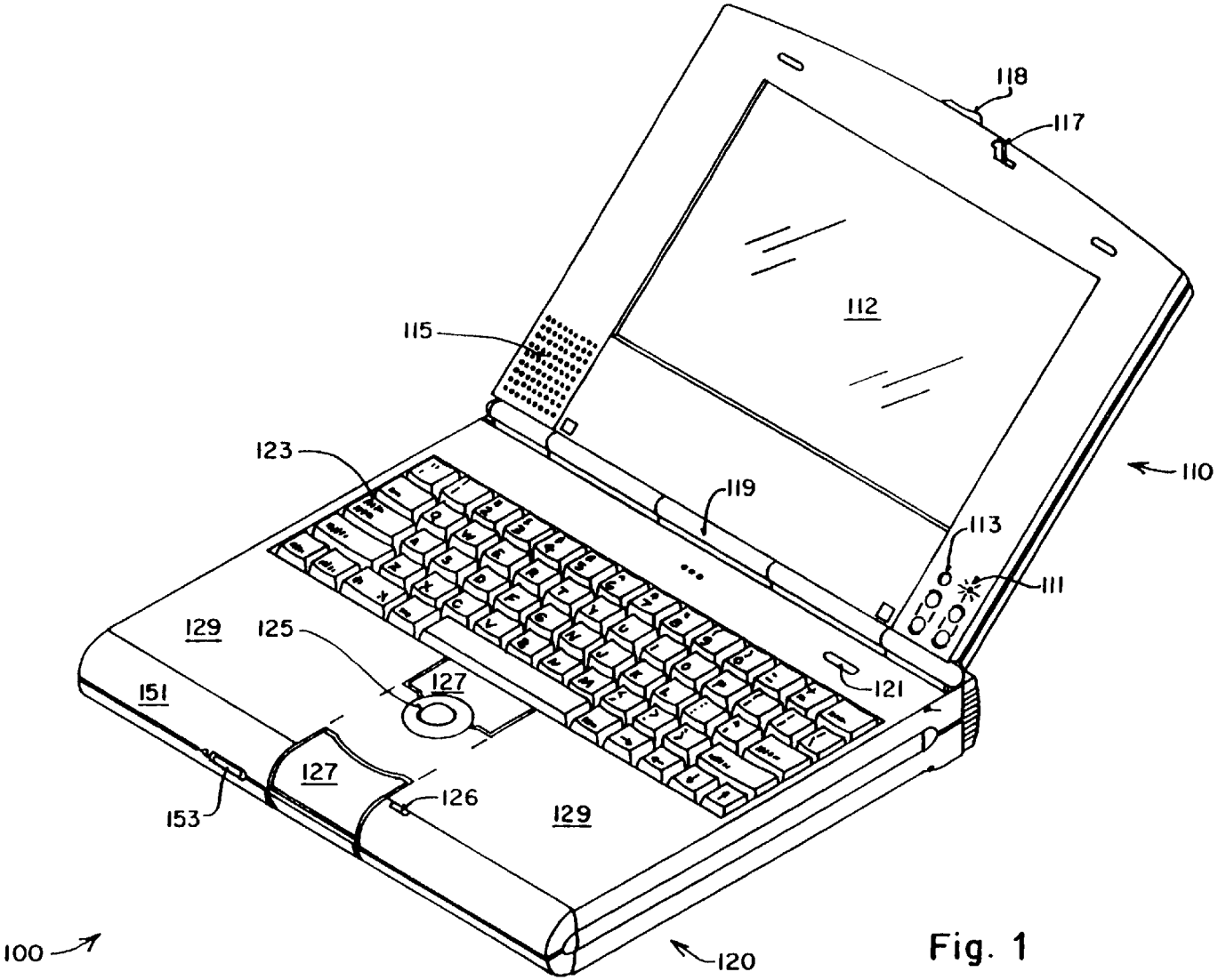
FIG. 1 is a front perspective of the portable computer.
Figure 2:
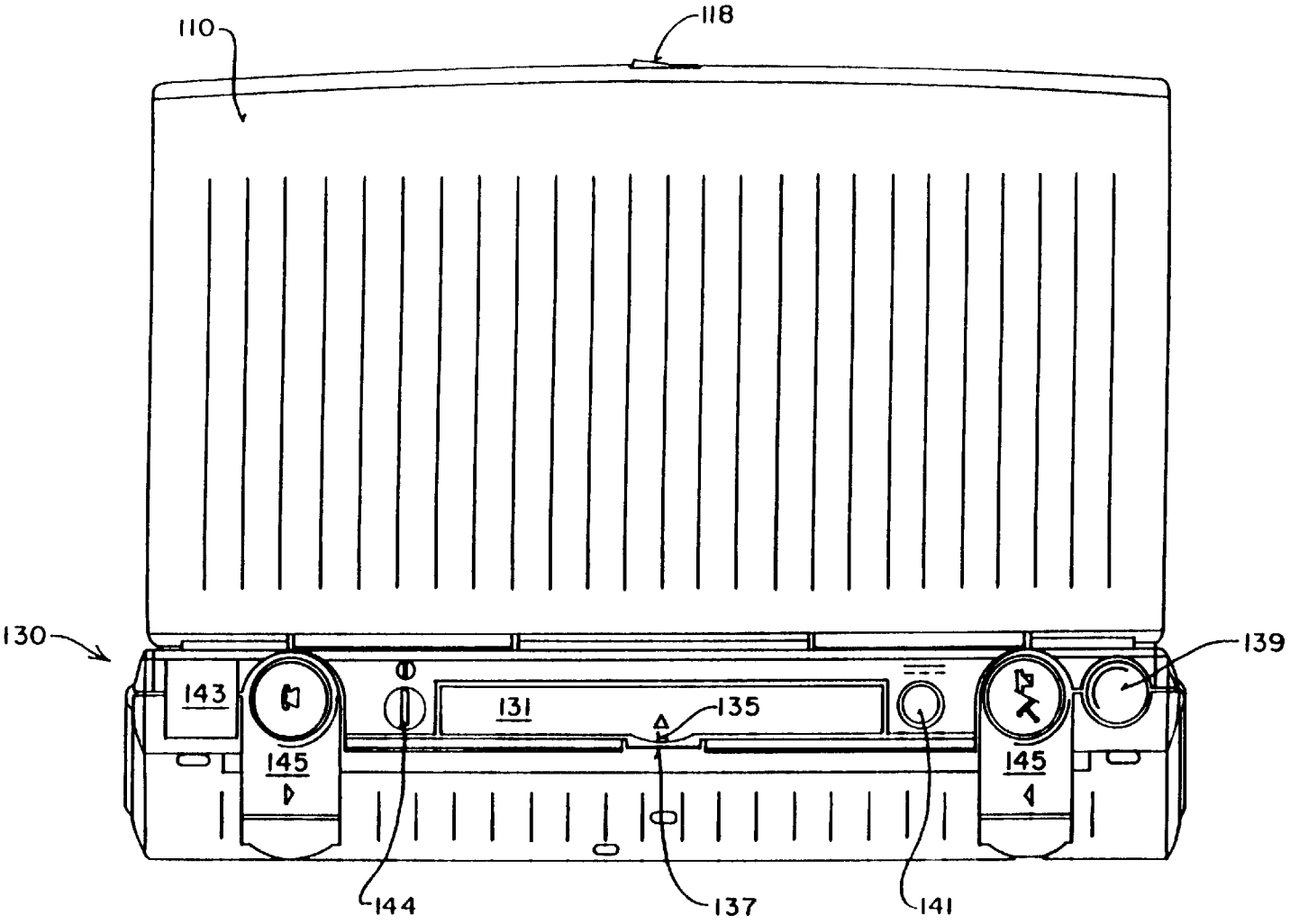
FIG. 2 is a back perspective of the portable computer, with its docking connector covered and feet in the open position.
Figure 3:
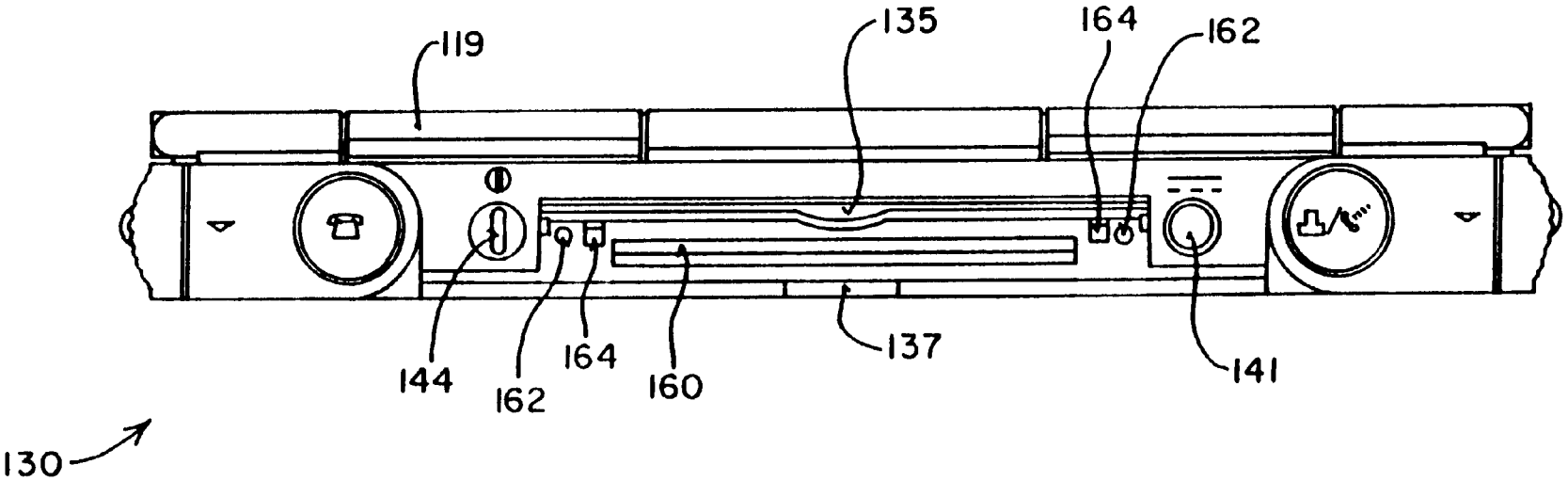
FIG. 3 is a back perspective of the portable computer, showing the portable computer in a closed position with its feet in their closed position and with the docking connector uncovered.

Portable computer 100 is shown in a front perspective in FIG. 1 and in a rear perspective in FIGS. 2 and 3. In this embodiment, computer 100 comprises display assembly 110 and base assembly 120. Display assembly 110 further comprises liquid crystal display ("LCD") panel 112, brightness controls 111 and contrast controls 113, and speaker 115. Latch 117 along the upper edge of display assembly 110, activated by latch button 118, is used to lock computer 100 in its closed position. Additionally, when display assembly 110 is in its closed position, latch 117 triggers a clamshell switch 101 (see FIG. 4) on the internal circuitry of computer 100, the switch signal indicating to the computer that it should place itself in a sleep state. Hinge assembly 119 allows display assembly 110 to open and close, as well as holding the display assembly open to the position chosen by the user.

Base assembly 120 contains the logic circuitry and memory of computer 100. Its exterior is comprised of keyboard assembly 123, power switch 121, trackball 125, select switches 127 and palmrest areas 129. Latching slot 126 receives latch 117 and permits access to clamshell switch 101 triggered by latch 117.

The front edge of base assembly 120 is partially comprised of battery compartment door 151. By pressing battery door button 153, the panel can be moved sideways, allowing the removal of computer 100's battery pack (not shown), door 151 being mechanically attached to the battery pack.

Rear panel 130 of computer 100 is shown in FIGS. 2 and 3. Connector door 131 is in the center of the rear panel and covers 152-pin connector 160. Door 131 opens upwards along a hinge line and retracts into the interior of computer 100. In so doing, panel cutout 137 is exposed. When door 131 is closed, cutout 137 is filled with door tab 135. Also exposed by opening door 131 are guide holes 162 and hook openings 164. The function of these will be described later. Rear panel 130 also has an serial (modem/printer/network) port 139, a power port 141, a modem port 143 and on/off button 144. Feet 145 are shown in their open position in FIG. 2 and in their closed position in FIG. 3. It should be noted that in their closed position, one of the legs covers serial port 139 and the other covers modem port 143.

The internal mechanical construction of portable computer 100 is shown and discussed in a related pending patent application entitled "Structural Frame for Portable Computer", filed Jun. 5, 1992, Ser. No. 07/893,853, now U.S. Pat. No. 5,237,486. That disclosure is incorporated herein for all purposes. With reference to the internal frame that comprises the mechanical backbone of portable computer 100, the frame has two holes for receiving guide pins from the electromechanical docking mechanism (described below) and two openings to receive and lock with mating hooks from the same mechanism.

Figure 4:
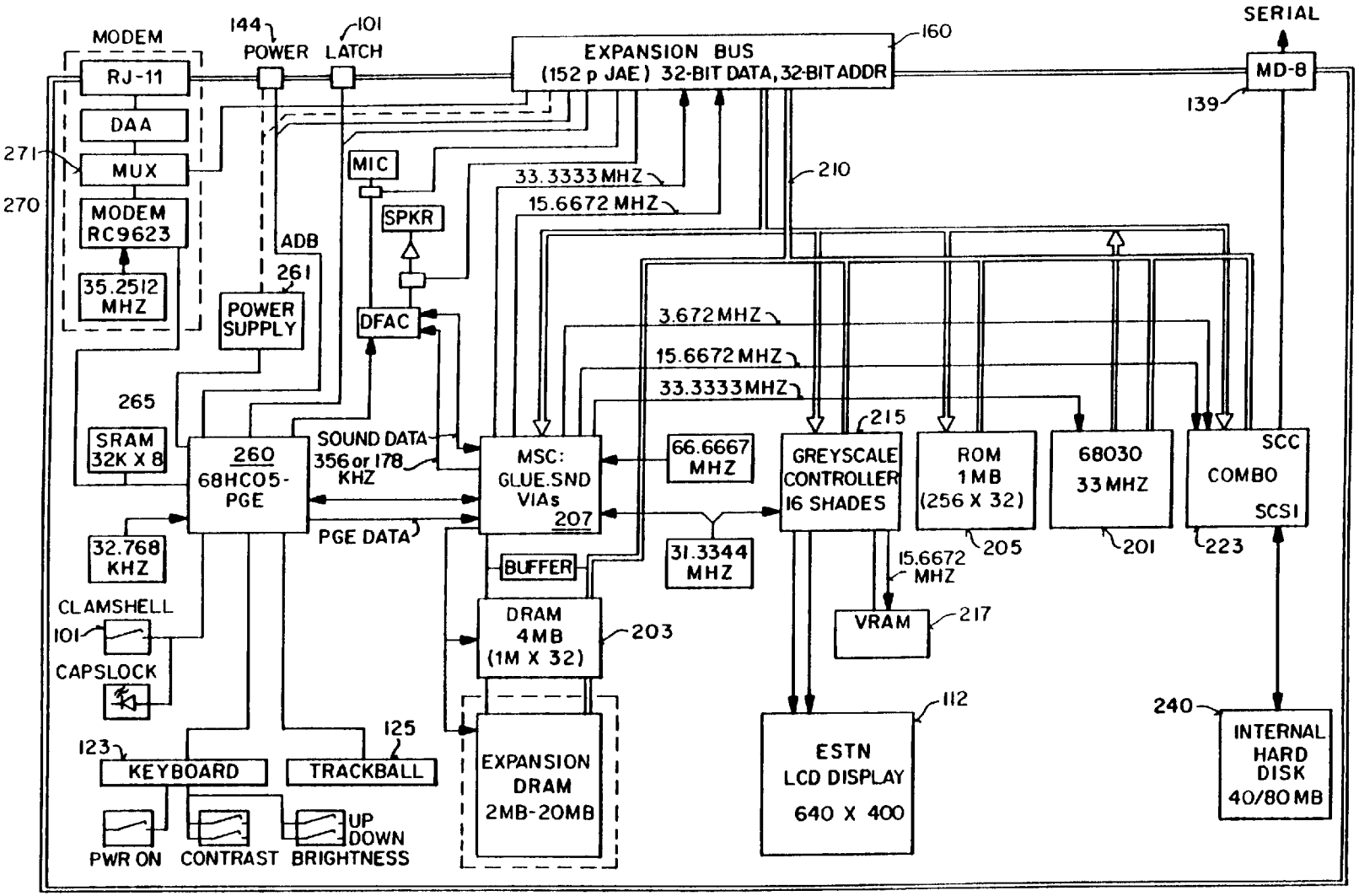
FIG. 4 is a block diagram of the circuitry of the portable computer.

FIG. 4 is a block diagram of the circuitry of portable computer 100. Computer 100's CPU 201 comprises a Motorola 68030 microprocessor with a clock speed of either 25 or 33 MHz. As this microprocessor is known and commercially available, it requires no further description here.

CPU 201 is coupled to both random access memory ("RAM") 203 and ROM 205 by means of bus 210. Main system controller ("MSC") 207 is also coupled to bus 210 and controls memory reading/writing as well as power control, I/O state machines and other support functions. Gray scale controller 215 is coupled to bus 210, video RAM ("VRAM") 217 and LCD panel 112. Input/output ("I/O") support chip 223 is coupled to bus 210, serial port 139 and hard disk storage 240. I/O support chip 223 facilitates data transfer to and from external sources and the internal hard disk drive storage. Finally, 152-pin connector 160 is coupled to bus 210.

EverWatch microcontroller 260 performs many functions relating to power management and the computer's operation, including reducing power consumption during periods of reduced computer use by placing the computer in a "sleep" mode, recharging the computer's internal battery, etc. EverWatch microcontroller 260 is coupled to MSC 207, power supply 261, on/off button 144, clamshell switch 101, keyboard 123 and trackball 125.

Modem 270 is coupled to both EverWatch microcontroller 260 and, through Mux 271, to 152-pin connector 160. Static RAM ("SRAM") 265 is also coupled to modem 270 and EverWatch microcontroller 260.

Various aspects of the construction and operation of portable computer 100 have been described in related patent applications. These include "Power Management System for Battery Powered Computers", Ser. No. 770,193, filed Oct. 1, 1991, now U.S. Pat. No. 5,254,928; "An Increased Efficiency Power Supply For Portable Computers", Ser. No. 802,810, filed Dec. 6, 1991, "Method and Apparatus For Variable Frame Rate Control", Ser. No. 819,169, filed Jan. 8, 1992, "Glichless High Speed Clock Mux", Ser. No. 893,635, filed Jun. 5, 1992, "Method and Apparatus For Reducing Transitions On Computer Signal Lines", Ser. No. 904,735, filed Jun. 26, 1992, and "Method and Apparatus for Battery Pack Testing", Ser. No. 893,863, filed Jun. 5, 1992. These disclosures are incorporated herein for all purposes. Other features of portable computer 100 which relate to the mechanical and electrical interface with docking station 500 will be described below.

DOCKING STATION

Figure 5:
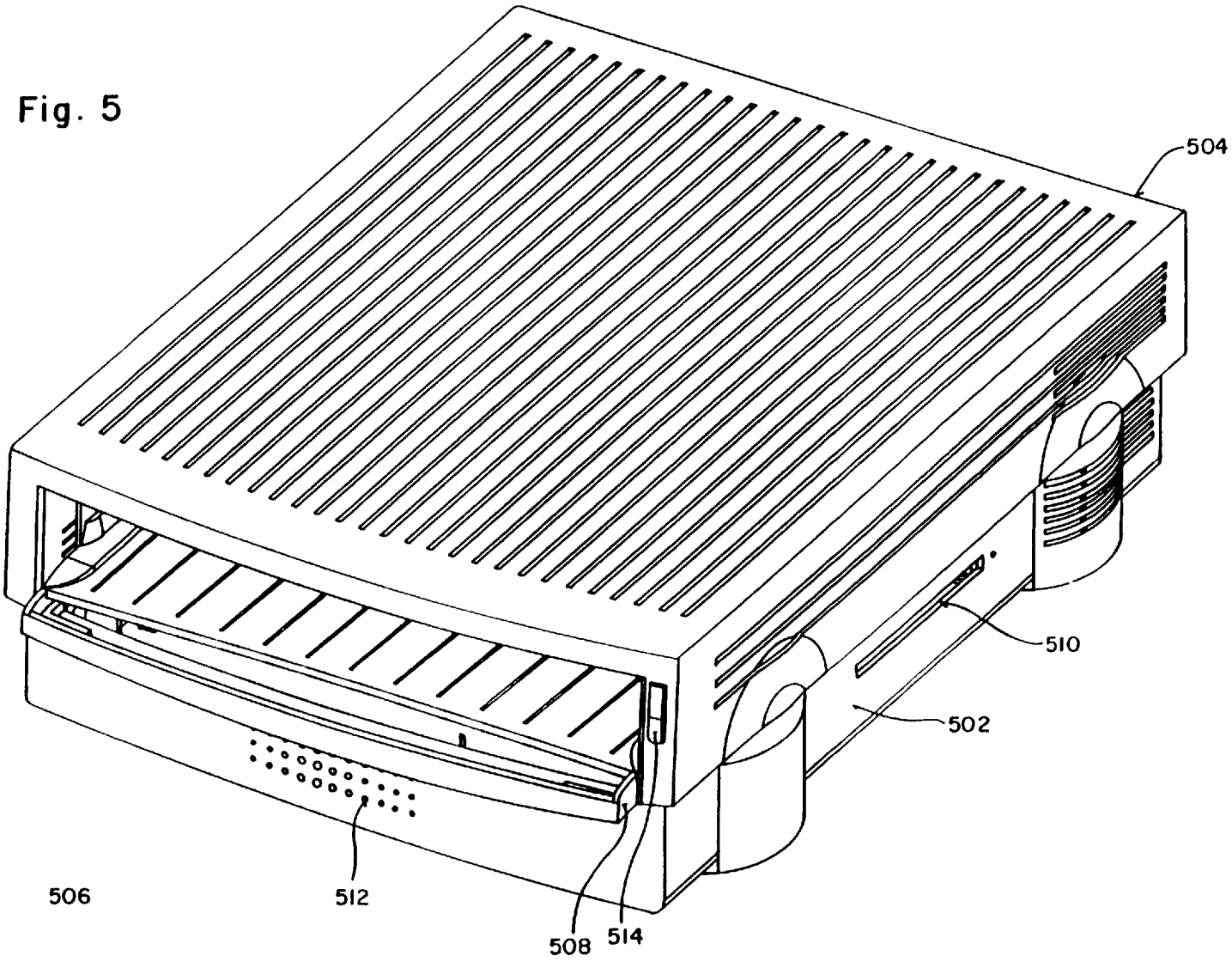
FIG. 5 is a front perspective of the docking station.

A front perspective of docking station 500 is shown in FIG. 5. As shown in FIG. 5, docking station 500 is comprised of base 502 and top 504. Portable computer insertion slot 506 is defined by top 504 and the front lip of frying pan 508. Also visible in FIG. 5 are speaker grill 512, floppy disk insertion slot 510 and electrical ejection button 514.

Figure 6:
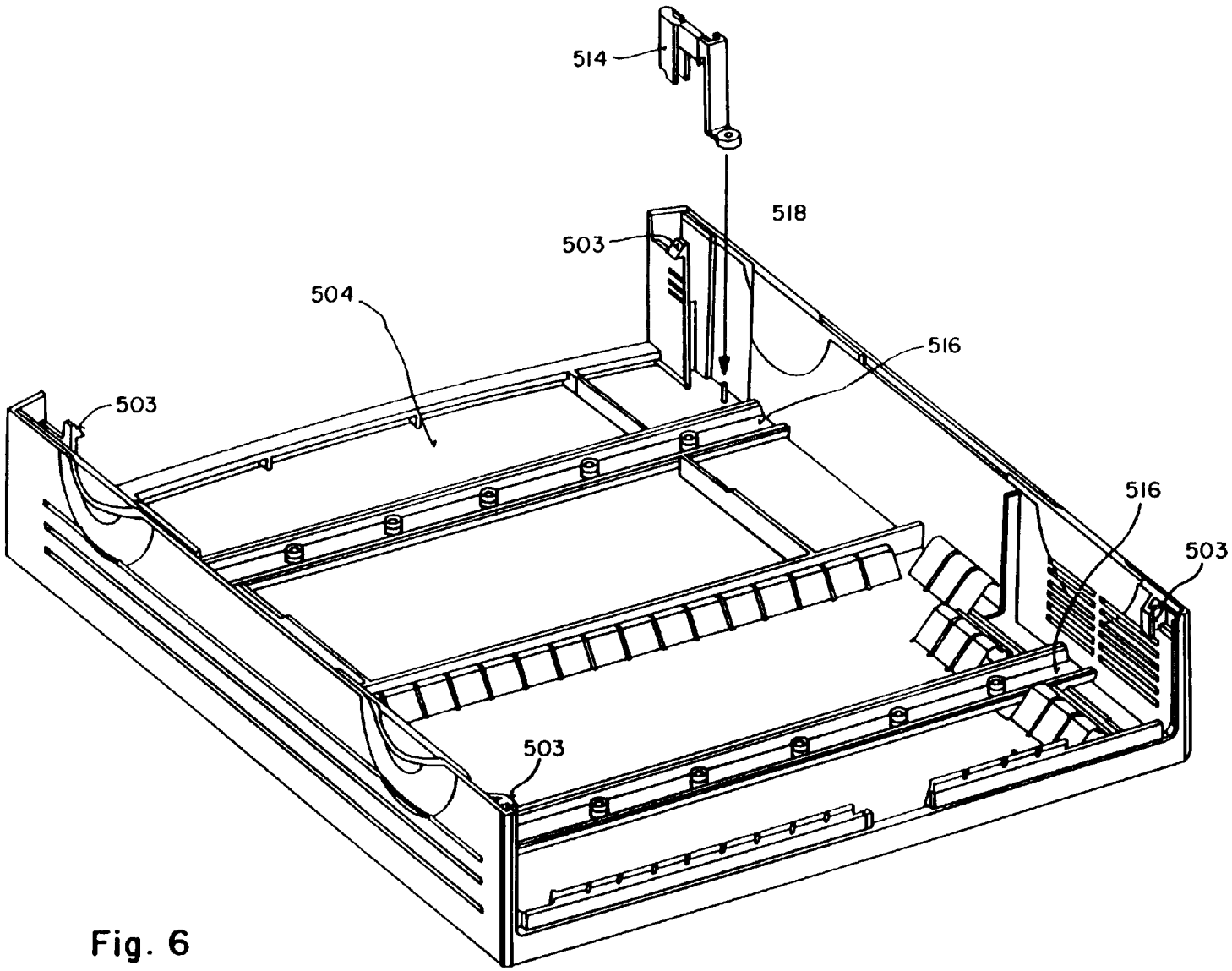
FIG. 6 is a perspective drawing of the underside of the top case of the docking station.

As shown in FIG. 6, top 504 has two structural cross beam supports 516 mounted thereon. When the present invention is in its operating configuration, these two cross beams help support the weight of a cathode ray tube ( "CRT") monitor which is placed on the top of the docking station. The cross beams can be attached to the internal top surface of top 504 in any one of several known manners including adhesives and plastic rivets. Electrical ejection button 514 is mounted in top 504 by means of stud 518 and is used to trigger the electrical eject cycle if certain conditions are met. These conditions are fully described later. Top 504 attaches to base 502 by means of clips 503.

Figure 7:
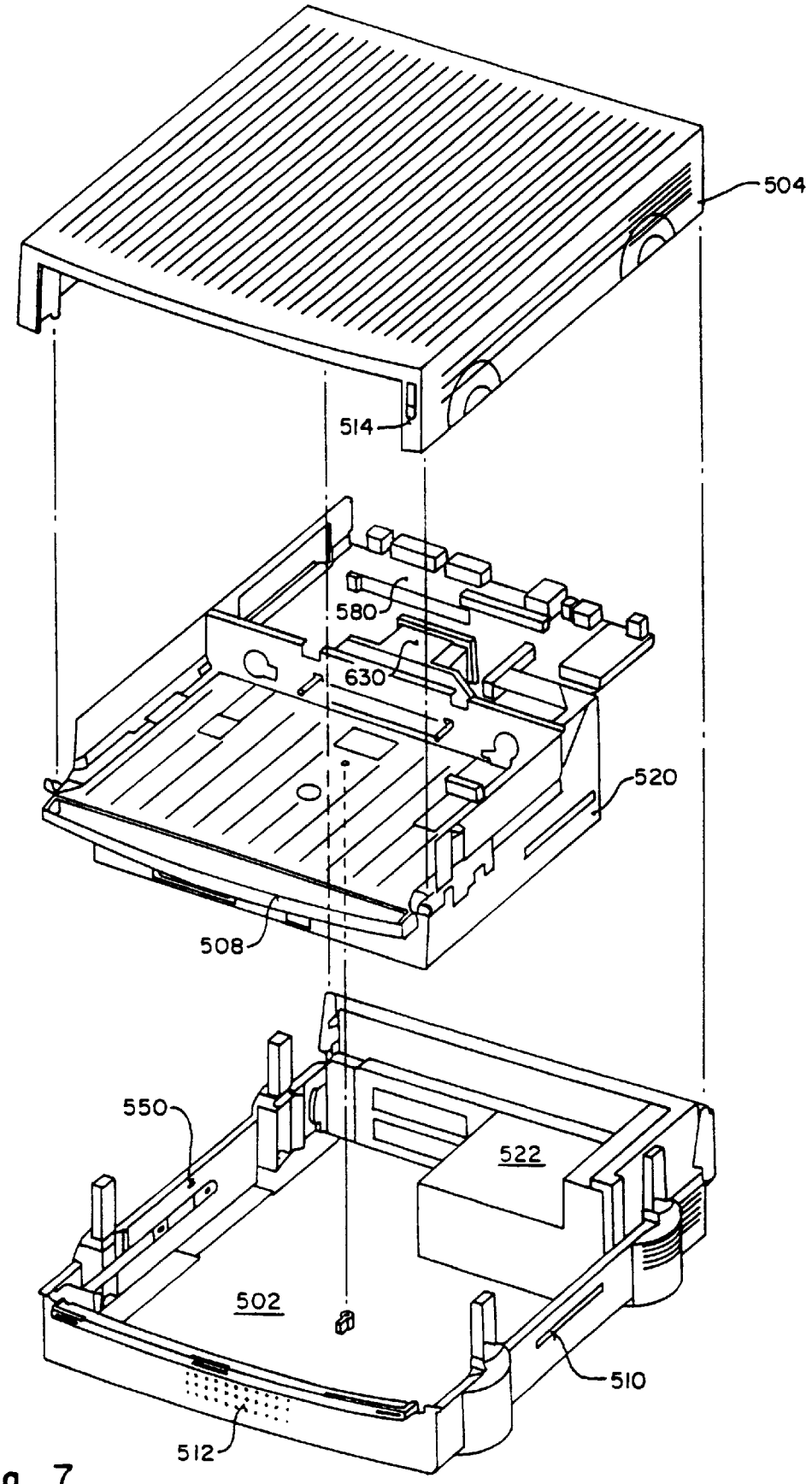
FIG. 7 is an exploded isometric drawing of the docking station.

FIG. 7 illustrates how the various components of docking station 500 are assembled together. These major components and assemblies center about base 502, frying pan 508 and skeleton 520, and top 504. The construction of each of these major assemblies will now be described in detail.

Figure 8:
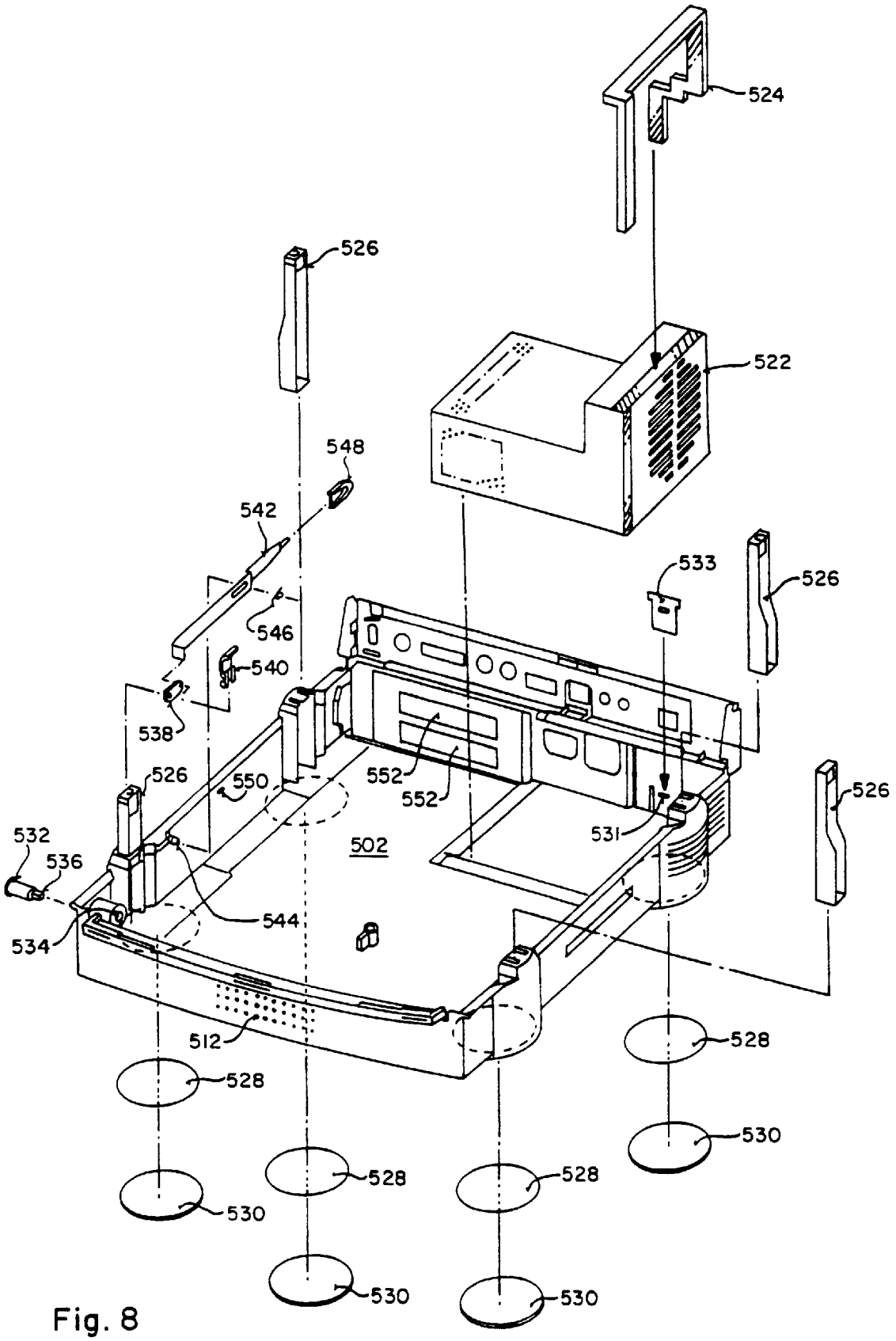
FIG. 8 is an exploded isometric drawing of the base of the docking station.

FIG. 8 is an exploded isometric drawing of base 502 and the components assembled thereon. Power supply assembly 522, which has an integral cooling fan, is mounted as a unit into base 502 and provides a continuous 75 watts of power which is supplied to the circuitry of both docking station 500 and portable computer 100, when that computer is docked with the station and powered on. During docked operations, whenever AC power is supplied, power supply 522 provides two non-switched voltages: +19 V at 1 amp and +5 V at 80 milliamps. The +19 V voltage charges portable computer 100's, internal battery automatically under the control of EverWatch microcontroller 260 (see FIG. 4) whether or not the system is turned on. Motor assembly 630 (see FIG. 14) is also coupled to the +19 V voltage, which allows docking and undocking to occur at any time AC is present, even when docking station 500 is turned off. The +5 V voltage powers the motor control circuitry, which also allows docking and undocking to occur even if docking station 500 is turned off. The motor control circuitry comprises at least programmed array logic ("PAL") 690 (see FIG. 21), photodetector 584 (see FIG. 20), microswitches 586 and 588 (see FIG. 16) and eject button 514 (see FIG. 5) in this first embodiment. In successive embodiments it would be possible to use the +5 V voltage to power a LED which would indicate whether or not the docking station is locked. Alternatively, the same voltage source could power a small piezoelectric speaker which would indicate to the user when an attempt was made to remove or insert the portable computer from or into a locked docking station. Fan shroud 524 mounts atop and around power supply 522 and helps direct the cooling air supplied by the power supply's integral cooling fan. The rear of base 502 also has two openings designed to accept I/O bus subsystem cards compatible with NUBUS® I/O bus architecture and protocol promulgated by Texas Instruments, Dallas, Tex. (NUBUS is a registered trademark owned by Texas Instruments). Such I/O expansion cards which comply with and operate under the NUBUS standard are hereinafter referred to as NUBUS cards 552 which permit the installation of one 25 W or two standard 15 W NUBUS card(s).

Columns 526 mount in base 502. They are spaced along the side edges of base 502 and clip into position. Once mounted, and with top 504 in its proper position, these columns are located respectively underneath the four ends of cross beams 516 (see FIG. 6), which rest directly on top of the columns when station 500 is completely assembled. When a CRT monitor (up to 50 lb. in weight in this first embodiment) is then placed on top 504, its weight is supported by the cross beams and the load is transmitted through them into the columns and thence into the desk or table that supports station 500. The use of this internal structural framework increases the size and weight of the monitor that the station can support and also eliminates loading either portable computer 100 when it is inserted into the docking station or the docking station's internal skeleton 520 (see FIG. 9) or both. Feet 530 are adhesively mounted with pads 528 on the outer bottom surface of base 502 in recesses (not shown) in the base underneath each of the four columns. They help prevent damaging the surface that the docking station is placed upon and provide the necessary friction to keep the docking station stationary when portable computer 100 is inserted into the station.

Lock 532 is mounted through the side of base 502 in lock hole 534 which extends through the sidewall of base 502. Door bar lock 542 is mounted and pivots on the interior of the same sidewall through which lock 532 extends using door bar retainer 546 to attach door bar lock 542 to base pivot 544. Door bar lock 542 is coupled to rear rotating stud 536 of lock 532 by means of lock linkage plate 538, which has a first opening cut to fit stud 536 and a second opening cut to fit the end of door lock bar 542. Bracket 540 locks lock linkage plate 538 to both stud 536 and door bar lock 542. When lock 532 is turned to lock docking station 500, door bar lock 542 pivots about base pivot 544 and covers manual eject slot 550, which extends through the same sidewall of base 502 as does lock hole 534. Ejection slot block 548 is attached to the end of door bar lock 542 and blocks slot 550 as the key is turned. As door bar lock 542 moves, it also interacts with manual ejection linkage 662 (see FIG. 20) to release lock switch 686 on logic board 580. Releasing lock switch 686 provides a signal to PAL 690 which controls the operation of motor 631, the release signal preventing motor 631 from running.

Lock 532, when locked, prevents the removal of portable computer 100 by causing the blockage of manual ejection slot 540 in base 502 and by preventing docking motor 631 (see FIG. 14) from turning on. Thus, if the system is locked, a user cannot eject computer 100 manually or electrically.

Any forceful attempt to do so might damage computer 100. If docking station 500 is locked when no portable computer 100 is docked to the station, no computer can be inserted because motor 631 will not turn on to begin docking. Even if someone attempts to force a portable computer 100 into the docking station, hooks 638 of motor assembly 630 will be in their raised position and would strike the frame of computer 100, preventing further insertion, before the connectors in the docking station and computer were close enough to be mated.

Slot 531 in the rear of base 502 and lock plate 533 allow the user of the docking station to insert a locking fixture which can secure the docking station to the desk upon which it is resting.

Figure 9:
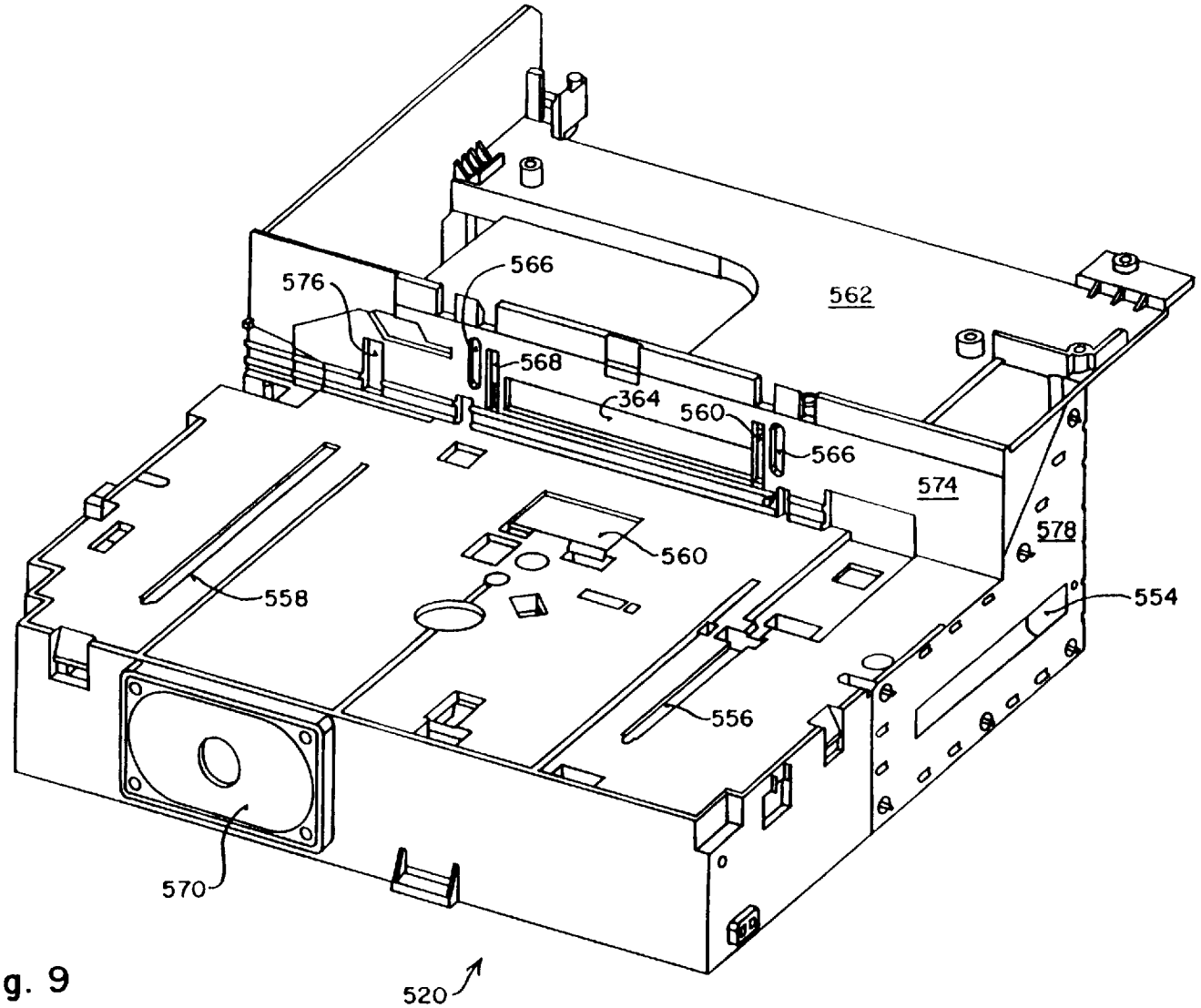
FIG. 9 is a perspective of the skeleton of the docking station.

FIG. 9 shows a front perspective of skeleton 520. Most of the internal mechanical components, as well as the circuit boards comprising the electrical systems of docking station 500 mount in or on skeleton 520. Skeleton floppy disk insertion slot 554 is cut into floppy disk panel 578 which attaches to the right sidewall of skeleton 520 (see FIG. 10). Speaker 570 mounts in enclosure 572 in the front of skeleton 520. Logic board mounting area 562 provides support for mounting logic board 580, modem DAA card 583 (see FIG. 20) and motor assembly 630 (see FIG. 14). Docking slot 564 allows the 152-pin connector 160 in computer 100 to mate with 152-pin connector 582 on logic board 580. Guide pin slots 566 allow guide pins 634 on motor frame 632 to extend from logic board mounting area 562 through docking wall 574. Hook slots 568 permit the same extension through wall 574 for hooks 638 on motor carriage 636. Door block opening 560 permits the installation of gate 610 (see FIG. 12). Right CPU pushout slot 556 and left CPU pushout slot 558 permit the installation of a damped spring ejection mechanism for portable computer 100 (see FIG. 13). Docking indicator slot 576 in docking wall 574 allows a docking indicator flag 592 on left CPU pushout 590 to extend through docking wall 574 to a photodetector unit 584 (see FIG. 20) mounted on logic board 580.

Figure 10:
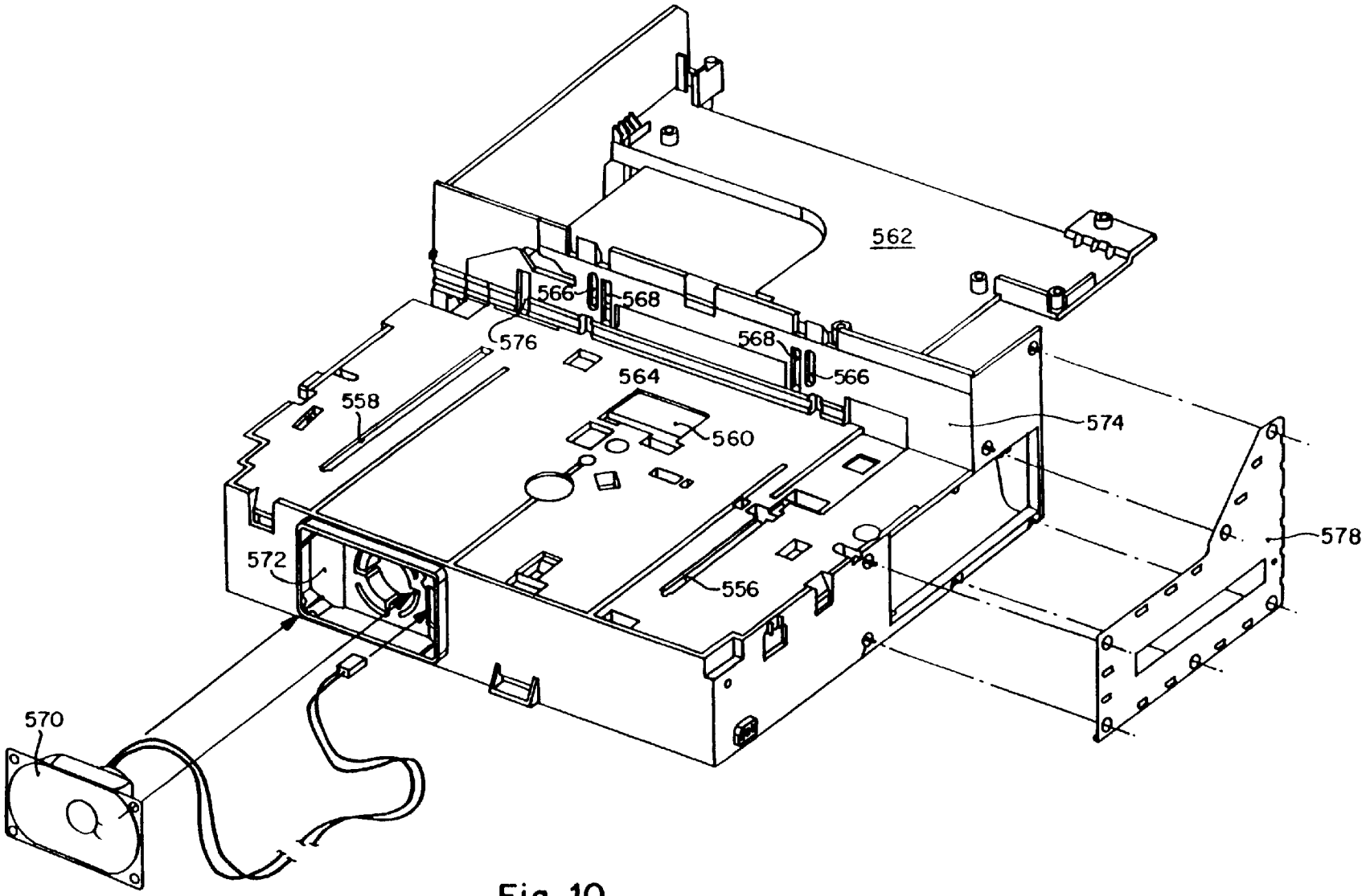
FIG. 10 is an exploded isometric drawing showing the top side of the skeleton.

FIG. 10 is an exploded isometric drawing of the upper portion of skeleton 520. As stated earlier, speaker 570 mounts in speaker enclosure 572 and floppy disk panel 578 mounts on the right side of skeleton 520.

Figure 11:
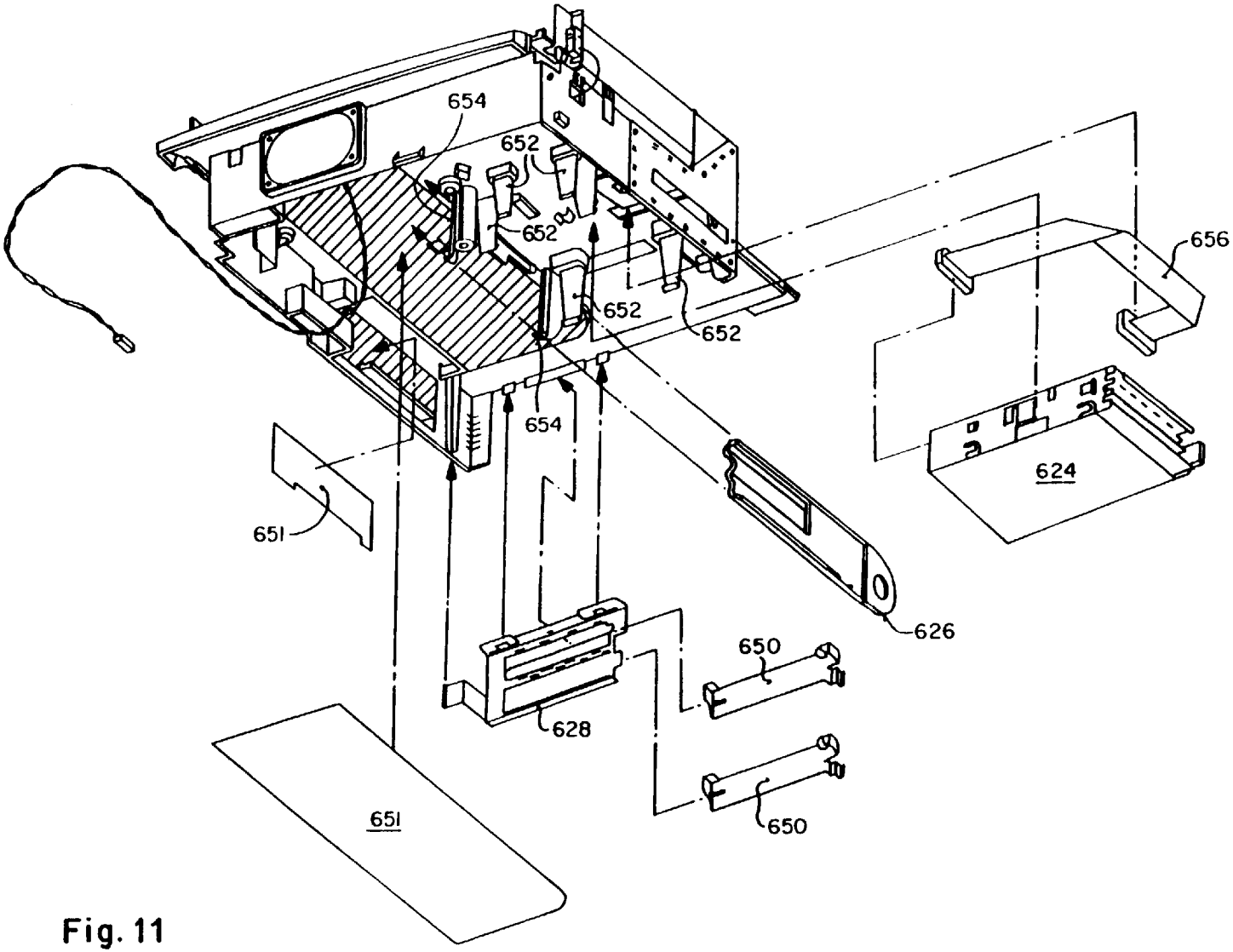
FIG. 11 is an exploded isometric drawing of the bottom side of the skeleton.

FIG. 11 is an exploded isometric drawing of the underside of skeleton 520. Floppy disk drive 624 is held in position by a plurality of floppy disk drive clips 652. NUBUS card guide support 626 is held in position by card guide clips 654. NUBUS connector bracket 628 clips onto the rear of skeleton 520 and helps support optional NUBUS cards. Bracket 628 can also have connector covers 650 attached thereto. Floppy disk drive cable 656 couples floppy disk drive 624 to logic board 580. Insulation sheets 651 are applied as indicated in the figure.

Figure 12:
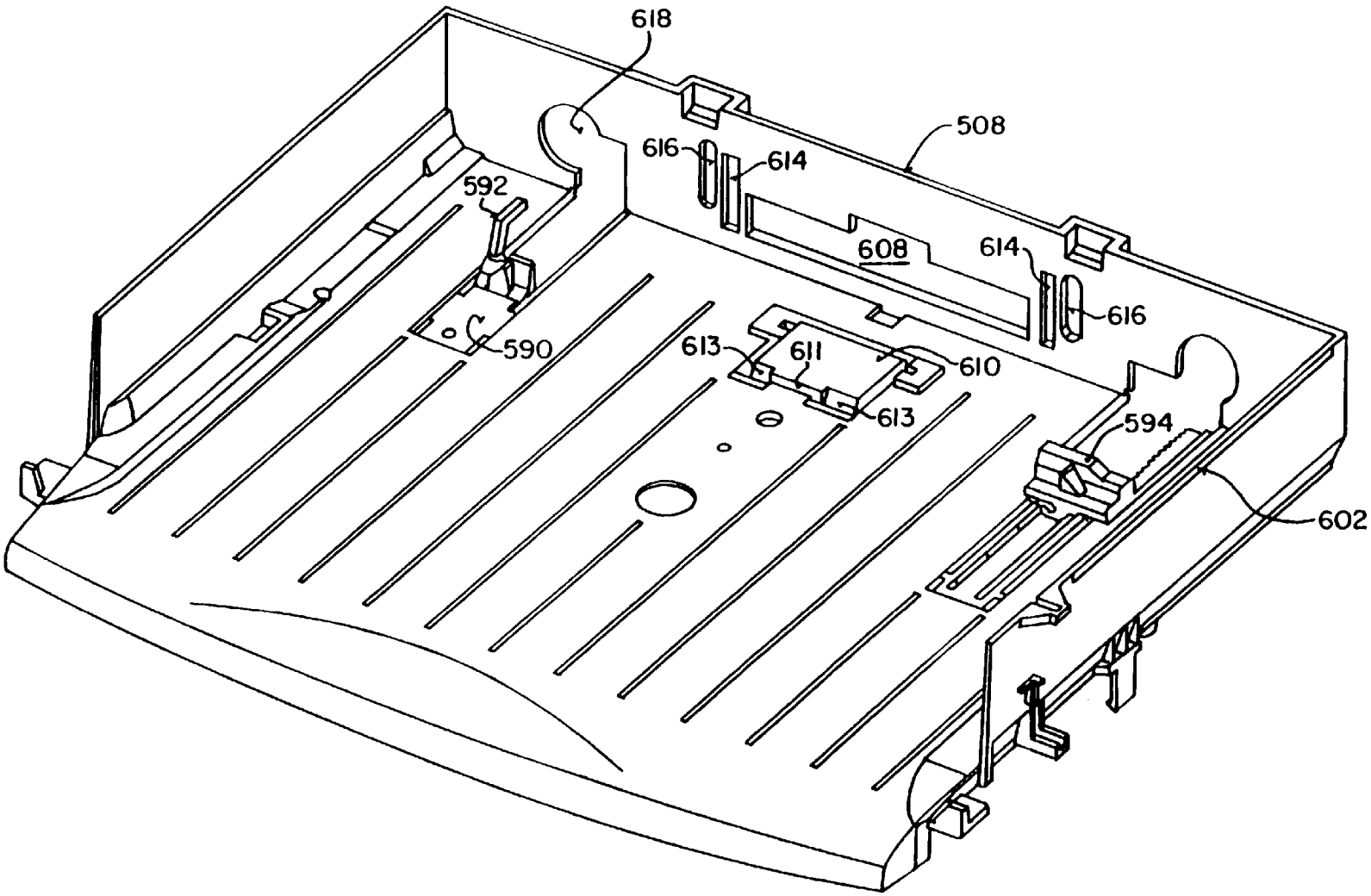
FIG. 12 is a perspective drawing of the assembled frying pan.
Figure 13:
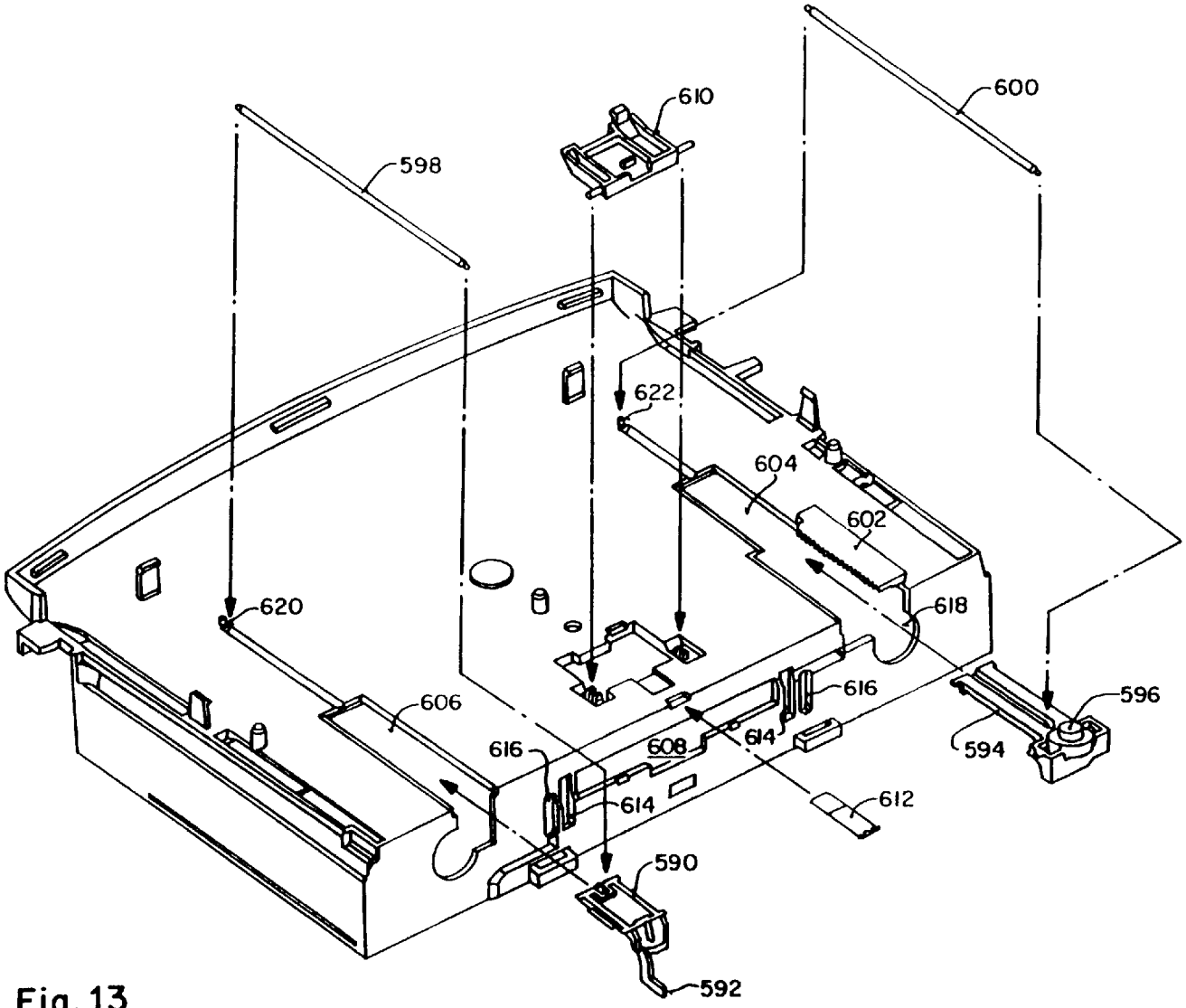
FIG. 13 is an exploded isometric drawing showing the construction of the frying pan.

Frying pan 508 is shown assembled in FIG. 12 and in an exploded isometric view, looking at the bottom of frying pan 508, in FIG. 13. Gate 610 prevents the insertion of portable computer 100 if the computer's rear connector door 131 (see FIGS. 2 and 3) is in its closed, lowered position. When door 131 is closed and computer 100 inserted into docking station 500, tab 135 of door 131 contacts the center area 611 of gate 610. As gate 610 is mounted in frying pan 508 using a gate spring (not shown) which biases gate 610 in an upwards position so that it rises above the planar surface defined by frying pan 508, contact between tab 135 and gate center 611 jams gate 610 in its upwards biased position, blocking further motion of computer 100 into docking station 500. As CPU pushout springs 598 and 600 were stretched by inserting computer 100 until it hit gate 610, releasing computer 100 after it hits gate 610 results in the computer being spring ejected from the docking station. Alternatively, if door 131 is open, the edges of panel cutout 137 ride up the ramped side portions 613 of gate 610, pushing the gate down and allowing computer 100 to be fully inserted into the docking station.

Left CPU pushout 590 mounts in left frying pan CPU pushout slot 606 in frying pan 508. Spring 598 attaches to left frying pan stud 620 and provides part of the necessary spring force to eject computer 100. Left CPU pushout 590 rides in slot 558 in skeleton 520 (see FIG. 10) when the frying pan is properly mounted atop the skeleton. Part of left CPU pushout 590 has been shaped as a flat vertically oriented panel, herein called docking indicator flag 592. When computer 100 is inserted into docking station 500, both the left and right CPU pushouts and their related springs are stretched. When computer 100 has been inserted to a point where hooks 638 of motor assembly 630 (see FIG. 14) can properly capture the frame of computer 100, docking indicator flag 592 extends through frying pan insertion indicator slot 618 and skeleton insertion indicator slot 576 (see FIG. 10) into photodetector unit 584 on logic board 580 (see FIG. 20). Breaking the light path of photodetector unit 584 indicates to PAL 690 (see FIG. 21) controlling motor assembly 630 that docking motor 631 should be started to begin the electromechanical docking of computer 100, unless lock switch 686 (see FIG. 20) indicates that the docking station is locked. Once portable computer 100 has been docked, a subsequent transmission of light in photodetector 584, which would occur when flag 592 is removed from the photodetector, turns on motor 631 and returns it to its ready position. This automatic resetting of the motor is critical for proper operation after a manual ejection occurs, whether or not there has been an interruption of AC power.

Right CPU pushout 594 mounts in right frying pan CPU pushout slot 604. One side of right CPU pushout slot 604 is lined with linear gear teeth 602. The lower portion of right CPU pushout 594 comprises a damping unit 596. Although not shown, damping unit 596 has pinion gear teeth which mesh with linear gear teeth 602. During ejection, the contraction of right and left CPU pushout springs 598 and 600 is slowed by the interaction of the pinion gear teeth of damping unit 596 and linear gear teeth 602. Right ejection spring 600 provides a second part of the needed spring force to help eject computer 100 and attaches to right CPU pushout 594 and right spring stud 622. Right CPU pushout slot 604 aligns with skeleton 520's right CPU pushout slot 556 when the frying pan is properly mounted on the skeleton.

Figure 14:
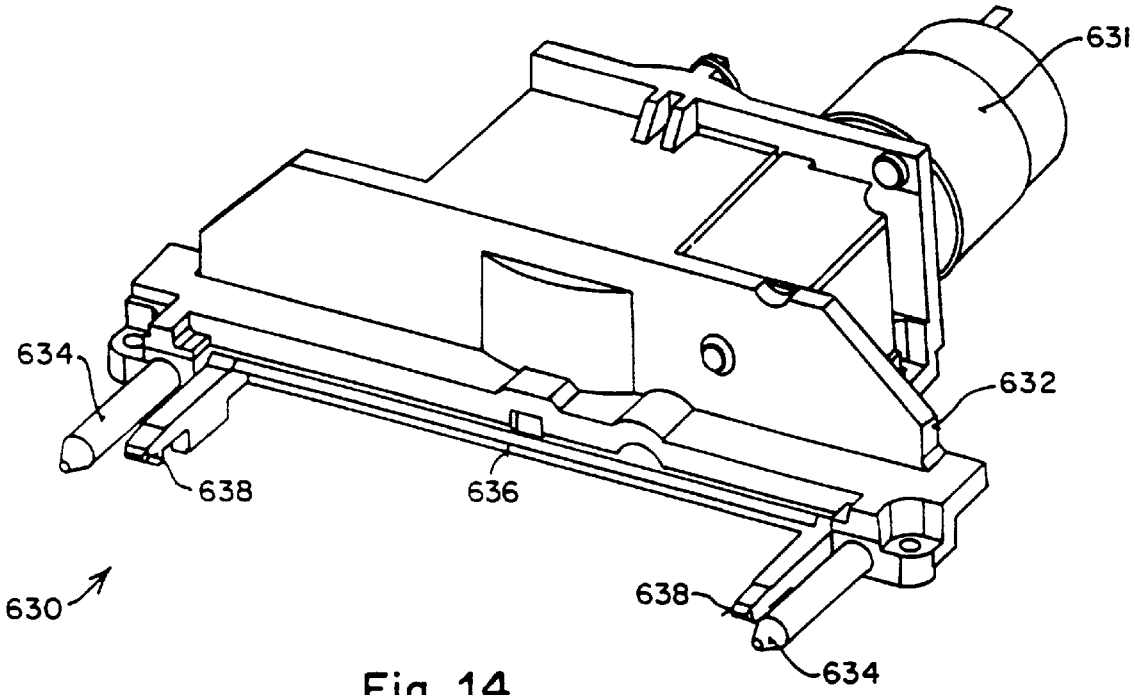
FIG. 14 is a top perspective drawing of the docking motor assembly.
Figure 15:
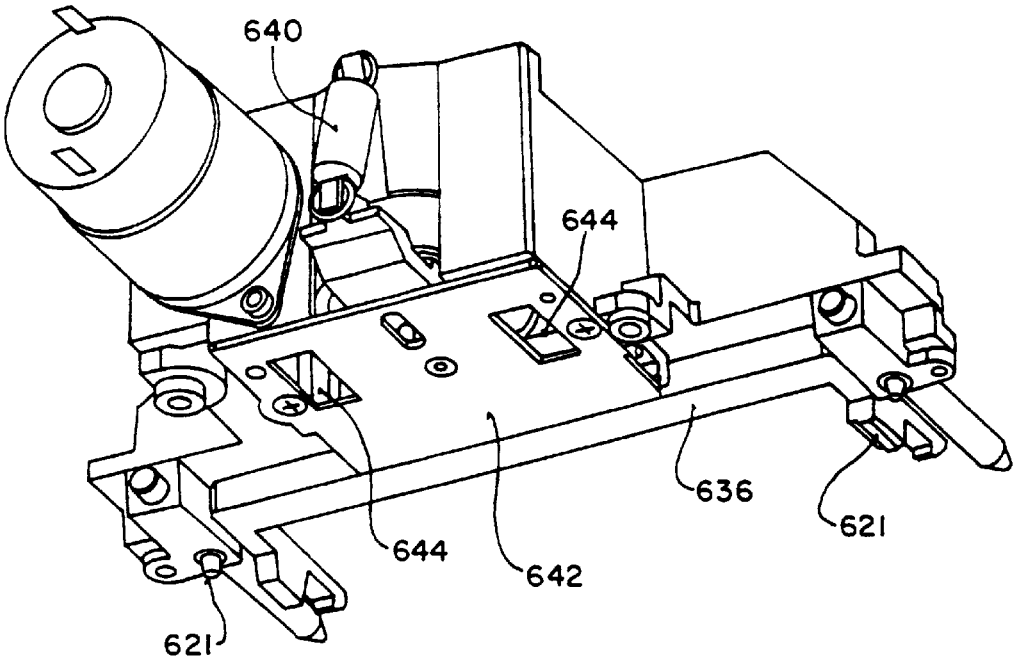
FIG. 15 is a bottom perspective drawing of the docking motor assembly.
Figure 16:
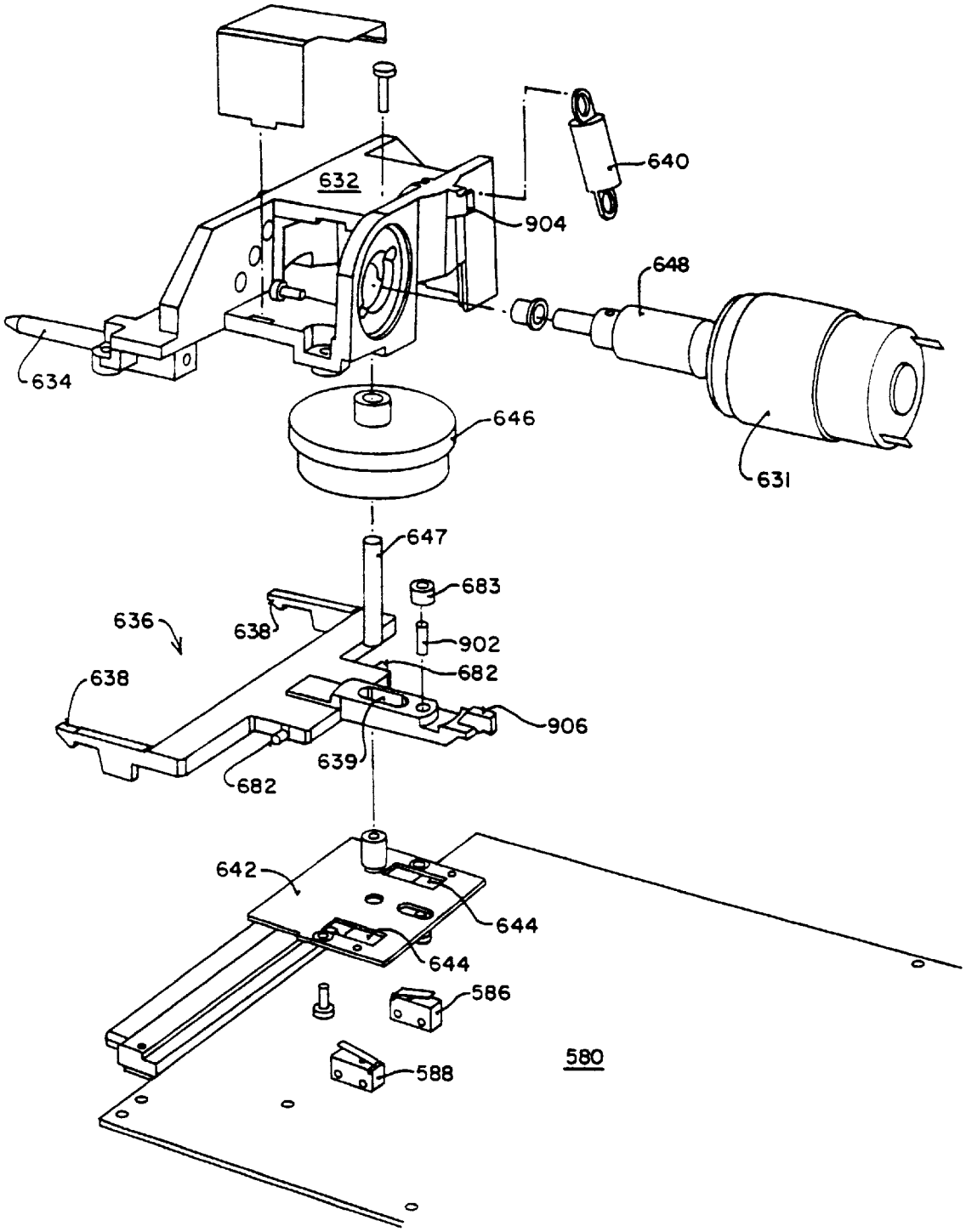
FIG. 16 is an exploded isometric drawing of the docking motor assembly.
Figure 17:
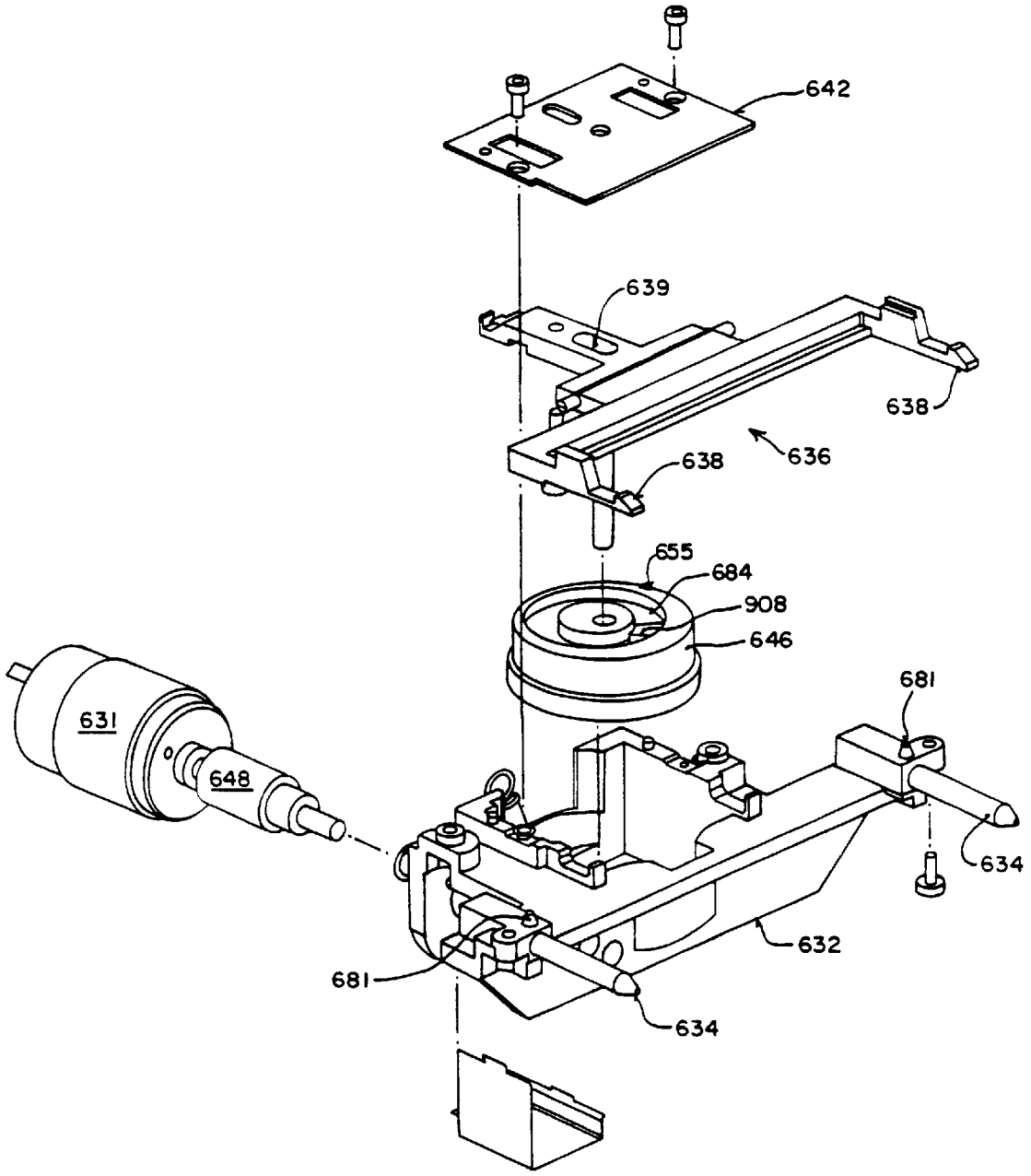
FIG. 17 is an exploded isometric drawing of the docking motor assembly, viewed from beneath the assembly.

Assembled docking motor assembly 630 is shown in both FIG. 14 and 15. FIGS. 16 and 17 are exploded isometric drawings of the motor assembly, showing the relationship of the parts to one another. Motor frame 632 provides the plastic structure which supports the other components of the assembly. Frame 632 has two guide pins 634 which insert into holes in the internal frame of computer 100. The proper insertion of the pins into the frame of the portable computer insures that the connector shells of connectors 160 and 582 (see FIGS. 3 and 20, respectively) are properly aligned for mating. Motor carriage 636 has two docking hooks 638 which insert through the frame of computer 100 and lock onto it. These hooks apply the force generated by the motor assembly to the computer. Bore 639 in carriage 636 allows the carriage to move through a 5 mm docking/ejection stroke.

In order to mate the portable computer to the docking station, a total of 30 lb. of force is needed, that force to be generated over a distance of 4.7 mm. Of that total force, 26 lbs. is needed to mate connectors 160 and 582 and 4 lbs. is needed to overcome the spring resistance of CPU pushouts 590 and 594 (see FIG. 13).

Motor 631 is an inexpensive D.C. motor which turns at a high RPM rate but which generates little torque In order to generate the needed torque, motor 631 drives a gearing system comprised of worm 648 and wormgear 646. The worm/wormgear combination provide a gear ratio reduction of 100:1. An additional 12.5:1 gear ratio reduction is achieved by the nature of the offset cam which forms part of the wormgear. Together, the worm/wormgear/cam combination provides a 1250:1 total gear ratio reduction and generates 30 lbs. of force Wormgear axle 647, which is used to mount wormgear 646 to frame 632, passes through bore 639 in carriage 636. Worm 648 meshes with wormgear 646, the wormgear rotating once for every 100 revolutions of worm 648. As shown in FIG. 17, the undersurface of wormgear 646 has a ramped eccentric slot 684 cut therein, the eccentric offset being 2.5 mm from the true center of the wormgear and the ramp having a single high point, oriented along the gear's axle. Spring 640 is attached at one end to hook 904 on carriage 632 and at the other end to hook 906 on carriage 636. Cam follower 683, mounted on motor carriage 636 by means of axle 902, rides in ramped slot 684 and is held in this position by motor spring 640, which normally biases carriage 636 to its lowered position, the position it has when engaged with the frame of the portable computer. As wormgear 646 rotates with cam follower 683 held in ramped eccentric slot 684 by spring 640, the ramp profile of slot 684 gradually forces carriage 636 to pivot on pivots 682 into a raised position, where hooks 638 release from the frame of computer 100, allowing the computer to be ejected, provided the power stroke of motor assembly 630 has already decoupled the connectors. Carriage 636 is only placed in this raised position once every full rotation of wormgear 646. A small resting "ledge" 908 in slot 684 supports cam follower 683 when wormgear 646 has reached the point where the hooks should release. The hooks remain in this raised position until docking indicator flag 592 (see FIG. 13) triggers photodetector unit 584 (see FIG. 20). indicating that a portable computer has been inserted, and locking switch 686 indicates that a computer can be inserted. Once motor 631 begins to turn, cam follower 683 moves off this lip in slot 684, whereupon spring 640 returns carriage 636 to its lowered position, allowing hooks 638 to latch onto the frame of the portable computer. When hooks 638 are latched onto the frame of computer 100, the reciprocating motion of carriage 636 pulls computer 100 to its fully docked position. For every 180° of rotation of wormgear 646, a power stroke of 5 mm is generated.

Figure 18:
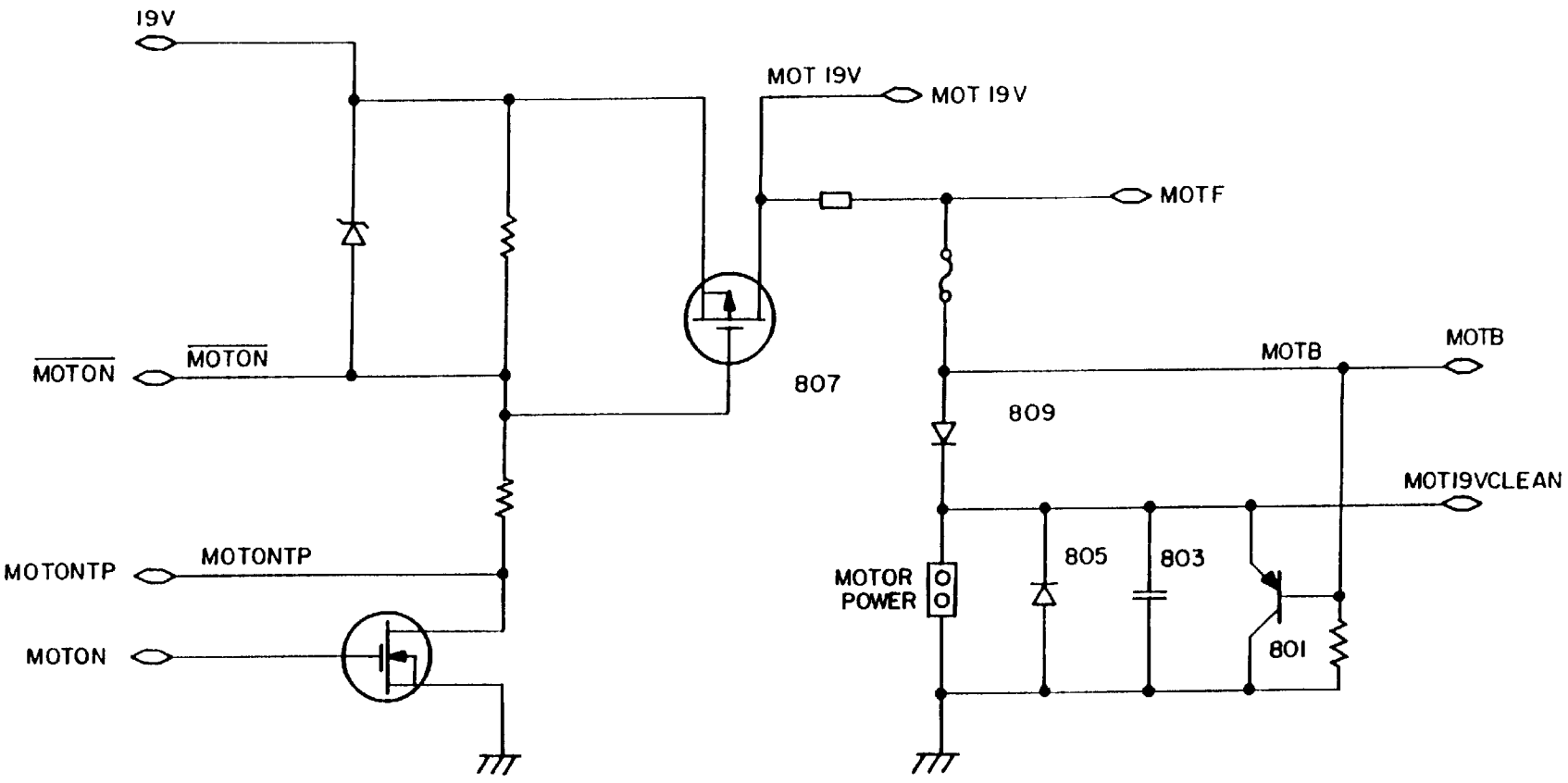
FIG. 18 is a schematic of the braking circuit used with the docking motor assembly.

During both docking and ejection, it is critical that the motor assembly stop in a particular point. For example, if the motor continued to spin after the computer had been fully docked, the connectors might be disconnected. Similarly, if the motor continued to spin after the computer was fully ejected, hooks 638 might capture the frame of the computer again before the user could remove it. As the motor runs at slightly different speeds as it ages and under different load and temperature condition, an electronic braking system has been provided to insure that the motor stops as quickly as possible after current flow to the motor has been stopped. This brake system absorbs the momentum of the motor by electronically converting the motor into a generator with a direct current path to ground. Braking system 800 is shown in FIG. 18.

The signal to turn off motor 631, MOTON, turns off transistor 807. Motor 631 still has a certain voltage across it. With transistor 807 off and diode 809 reverse biased, transistor 801 turns on, providing a current path to ground which very rapidly drains off the remaining voltage on motor 631, braking it to a complete stop in a very short time interval.

Ejecting computer 100 from docking station 500 first requires a power stroke from motor assembly 630 to disconnect the connectors. After the power stroke, hooks 638 must be released from the frame of computer 100. Once the hooks are released, CPU pushouts 590 and 594 eject the computer as springs 598 and 600 return to their relaxed, contracted state. As stated, the motion of cam follower 683 in ramped eccentric slot 684 forces hooks 638 of carriage 639 into this raised position once every full rotation of wormgear 646. This deflecting motion occurs after a sufficient amount of linear reciprocating motion has occurred to disconnect the 152-pin connectors. Hooks 638 remain in this raised position as long as cam follower 683 rests on the lip in slot 684.

To activate and control the insertion and ejection process, docking station 500 is provided with several sensors and switches. Attached to left CPU pushout 590 is a small docking indicator flag 592 (see FIG. 13). As computer 100 is inserted into docking station 500, it contacts the CPU pushouts and begins to extend them. At the point where hooks 638 can properly engage with the frame of the portable computer, flag 592 projects through frying pan docking slot 608 and skeleton docking slot 576 into a photodetector unit 584 on logic board 580 (see FIG. 20), breaking the light, which causes photodetector unit 584 to generate a first "insertion beginning" signal. This signal triggers the start of motor 631, if lock switch 686 indicates that the docking station is unlocked.

The lower surface of wormgear 646 has a small projection 655 (see FIG. 17) extending therefrom. Mounted on logic board 580 are two small switches 586 and 588 (see FIG. 16). As wormgear 646 rotates, switches 586 and 588 are turned on momentarily in sequence, one switch being triggered by each 180° of wormgear 646's rotation. It should be noted that wormgear 646 only rotates in one direction. Given this unidirectional motion, it takes a combination of signals from lock switch 686 and switches 586 and 588 to indicate whether portable computer 100 has been successfully docked or not A signal from switch 586 and photodetector 584 indicates that the computer has been successfully docked. A signal from switch 588 and a low signal from photodetector 584 (light being transmitted in the photodetector) indicates that the portable computer has been ejected successfully.

The signals from switches 586 and 588 are debounced by an RC filter network and then applied to a Schmitt trigger inverter before being used by PAL 690. Photodetector 584s signal is applied to a Schmitt trigger inverter for hysteresis before being used by the PAL. Together, the signals from switches 586 and 588, photodetector 584, eject button 514 and lock switch 686 feed a gray code state machine which allows synchronous PAL 690 to function properly in response to asynchronous human and mechanical docking/undocking indicators.

Figure 19:
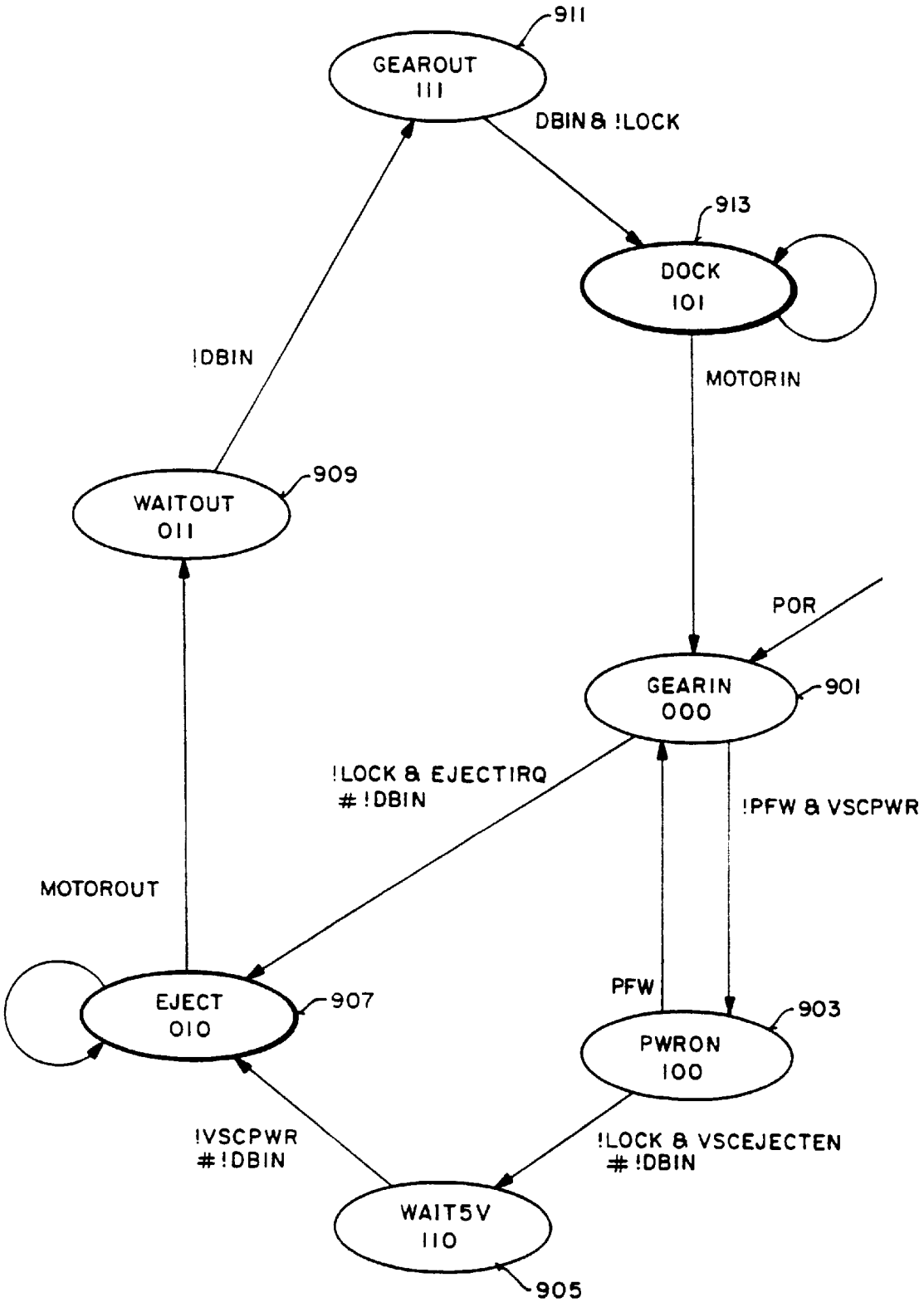
FIG. 19 is a state table diagram illustrating the operation of the docking motor assembly.

FIG. 19 is a state table diagram which illustrates the different states that motor assembly 630 can be in. Although it is not possible to designate any one state as the "starting position" of the present invention, a logical place to begin this description of the state machine is at state 901, Gearin. State 901 can be reached in any one of three ways. First, initial AC powering of docking station 500 or any other "power-on-reset" signal places the machine in state 901.

Additionally, a power fail warning signal or a "motorin" signal can place the machine in state 901, depending on the previous state. In state 901, hooks 638 are in their fully retracted position. If the portable computer has not been inserted or if the system is not locked and an ejection request has been received, then the system moves to state 907, Eject. The system remains in state 907 until microswitch 588 provides a "motorout" signal, indicating that hooks 638 are in their fully extended position. Upon receiving the "motorout" signal, the system moves to state 909, Waitout. State 909 provides a waiting period of variable length which lasts until a clear indication is received from the photodetector unit that the portable computer has been fully ejected. Upon receipt of that signal from the photodetector unit, the system moves to state 911, Gearout, where hooks 638 are in their fully extended, raised position. Upon receipt from the photodetector of the signal indicating that a portable computer 100 has been inserted and receipt of a signal indicating that the docking station has not been locked, the system moves to state 913, Dock. In state 913, the motor assembly turns on and remains on until a signal from microswitch 586 indicates that motor 631 has rotated the correct amount. The system then returns to state 901. State 903, Pwron, is reached from state 901 if a power failure warning is not received and VSC 712 has power. In state 903, a power fail warning signal returns the system to state 901. If the system is not locked and VSC 712 provides an ejection enable signal or the photodetector signals that the portable computer is not in the docking system, then the system moves to state 905. Wait 5 V. The system waits in state 905 until either VSC 712 indicates that power is off or the photodetector continues to indicate that there is no portable computer in the docking station. If either signal is received, the system goes to state 907. It should be noted that the motor is on only when looping in states 907 and 913 and that the motor continues to run until the appropriate microswitch generates a signal that the motor's rotation has carried it to that switch.

Figure 20:
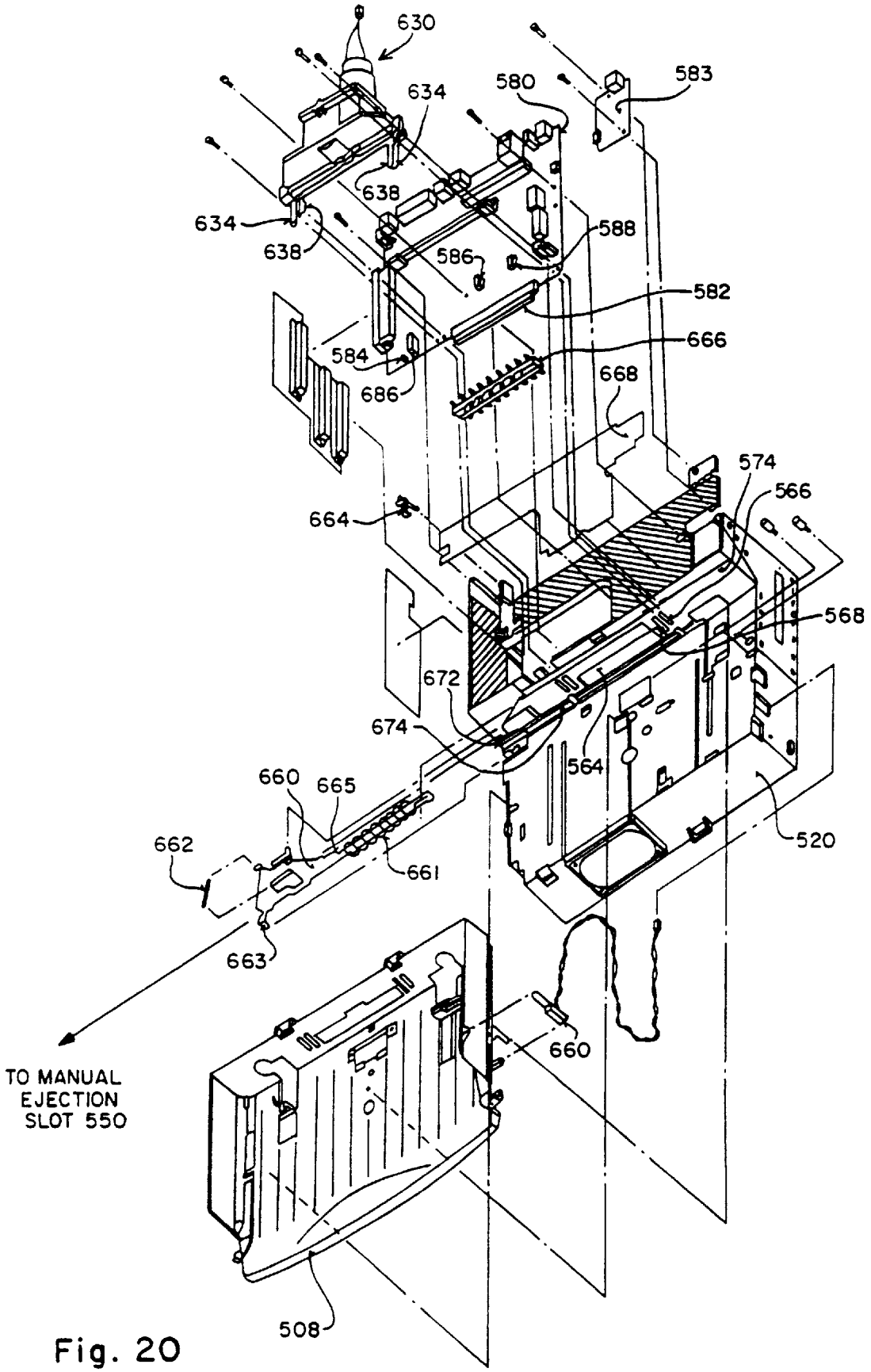
FIG. 20 is an exploded isometric drawing of the frying pan/skeleton.

FIG. 20 is an exploded isometric drawing showing how frying pan 508, skeleton 520 and their related components are mated together. Motor assembly 630 is aligned to logic board 580 by means of several plastic studs 681 (see FIG. 17) which extend through the logic board into skeleton 520. When the logic board is attached to the skeleton, hooks 638 extend through hook slots 568, guide pins 634 extend through guide pin slots 566, and 152-pin connector 582 extends into docking slot 564. Electromagnetic interference ("EMI") shield 666 surrounds connector 582 and mounts in docking slot 564. Logic board 580 is attached to logic board mounting area 562 by means of a plurality of metal screws. Logic board insulator sheet 668 is placed between logic board 580 and logic board mounting area 562. Modem card 583 is electronically coupled to logic board 580 using a 10-pin connector and is also mounted on logic board mounting area 562 in the same manner as the logic board.

Manual ejection linkage 662 mounts along docking wall 574 of skeleton 520. As shown, linkage 662 mounts on manual ejection stud 672 and slides laterally in manual ejection linkage track 674. Manual ejection spring 661 biases the linkage to its inactive state, with ejection plate 663 abutting manual ejection slot 550 in base 502. During use of the docking station, if a complete power failure occurs, or if for any other reason electrical ejection cannot be accomplished, a key, thin blade screwdriver, key, or similar tool may be inserted into slot 550 to contact and push against ejection plate 663. Pushing on ejection plate 663 pushes linkage 662 laterally across skeleton 520. Eventually, a ramped edge 665 of linkage 662 contacts motor assembly 630 and deflects hooks 638 upwards. Immediately after hooks 638 are pushed upwards, they release from the frame of portable computer 100. The user of the system can then manually release the computer from the 152-pin connector and remove the computer from the docking system. When power is returned to the system, PAL 690 (see FIG. 21) detects the low signal from photodetector 584, which indicates that the computer has been removed. As the state of the docking station in this situation is not a valid operating state, PAL 690 turns on motor 631. As the motor rotates, linkage 662 is released and pops out again. Lock switch 686, which was released by pushing ejection plate 663, is then depressed. PAL 690 continues to drive motor 631 until switch 588 is actuated and hooks 638 are in their raised position again.

If motor assembly 630 jams, a resettable thermal fuse blows to prevent overheating and possible damage to the docking station. Once the jam condition is corrected, the fuse automatically resets. If the motor is not in a valid docked state (the photodetector does not indicate that portable computer 100 is in the docking station) or in a valid undocked state, with the hooks fully extended and raised, PAL 690 will return the system to a correct position based on the previously discussed state table diagram (see FIG. 19). This safeguard is also necessary to insure that hooks 638 are moved to their proper position when the docking station is first powered up.

Electronic ejection switch 660 attaches to the side of frying pan 508. This switch is triggered by pressing on electronic ejection button 514 mounted in top 504 (see FIG. 5). When pressed, the switch triggers an electronic eject of computer 100 if the requisite conditions exist. On/off button 664, which extends through the rear of base 502 when the docking station is completely assembled, provides a reset signal to the system when pressed.

Figure 21:
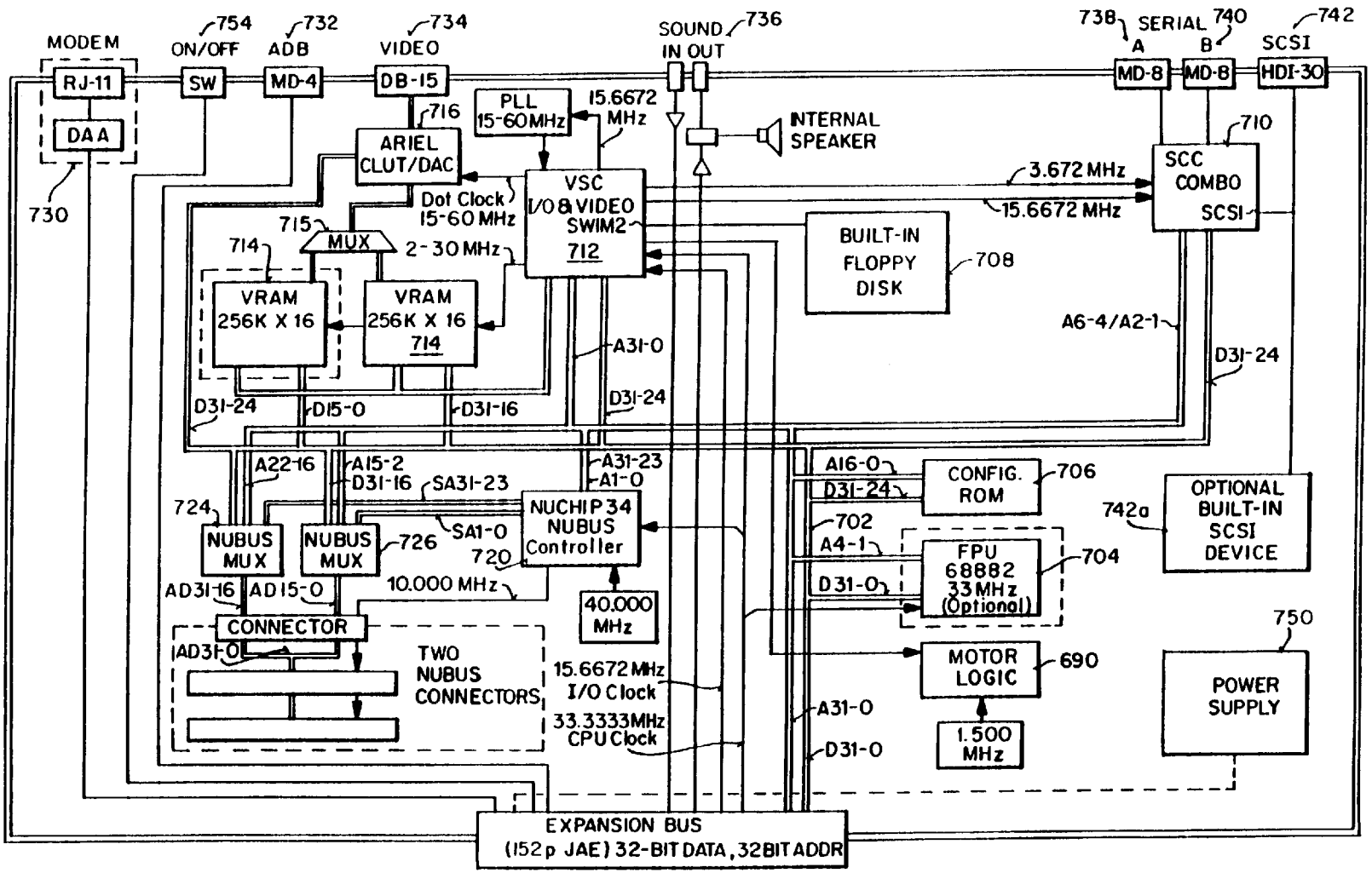
FIG. 21 is a block diagram of the docking station's electronics.

FIG. 21 is a block diagram of the electronic components of docking station 500. As stated earlier, the purpose of the docking station is to add display, I/O, video random access memory ("VRAM"), NUBUS expansion possibilities, and, optionally, computational power to portable computer 100.

The backbone of docking station electronics 700 is system bus 702, which provides a 32-bit address and data path. Configuration ROM 706 is coupled to bus 702 and provides docking station configuration information to CPU 201 in portable computer 100 when the computer and the station are docked. If desired, a floating point unit ("FPU") 704, also known as an arithmetic co-processor can be coupled to bus 702. FPU 704 performs arithmetic calculations faster than CPU 201, allowing math-intensive applications to run much more quickly.

Video controller 712 is coupled to bus 702 and controls video data and display for the docking station. VRAM 714 is also coupled to bus 702, as well as to video controller 712. VRAM 714 provides storage for video information prior to its display. VRAM 714 is coupled through Mux 715 to video digital/analog converter/color look-up table ("VDAC/CLUT") 716 which generates the red, green, and blue analog signals needed to drive a video monitor. Display video signals are then transmitted to a monitor through video port 734.

Floppy disk drive 708 is coupled through a floppy disk controller integrated into video controller 712 to bus 702.

One of the ways to expand the capabilities of docking station 500 is to add one or more NUBUS cards. The capabilities of a NUBUS card can include acceleration, expanded video capabilities, tape drive memory access, and networking. Provisions are made in this first embodiment of the present invention to couple up to two NUBUS cards to system bus 702. Two NUBUS Muxes 724 and 726 provide the necessary gateways between the bus and the NUBUS cards. NUBUS controller 720 with 40 Mhz clock 722 controls the flow of information to and from the NUBUS cards.

Additional I/O capabilities and memory expansion is available in the docking station. I/O controller 710 is coupled to serial ports 738 and 740, as well as SCSI port 742. Controller 710 permits the installation of optional SCSI devices 742a that could include a hard disk drive in the hard disk drive bay, which would then be coupled to system bus 702 through the controller 710. External devices such as a hard disk drive, a CD drive or a scanner would also be coupled to the docking station through controller 710. Power supply 750 supplies power to both docking station 500 and portable computer 100, as well as providing power to a switched AC convenience output source for the monitor. It should be noted that power supply 750 supplies +19 V to drive motor assembly 630 and to charge the batteries in portable computer 100, this voltage being available whenever AC power is supplied to the docking station. Additionally, a special, low current 5 V is also available whenever AC power is supplied to the docking station to provide power for photodetector 584 and the other motor control circuitry. The availability of this low current +5 V source, separate from the main +5 V source, and control logic in PAL 690 allow the possibility in a second embodiment of the present invention of powering a speaker or LED which would indicate that lock 532 is in its locked position. Motor logic, also known as PAL 690, controls the operation of motor assembly 630. Finally, docking station has sound in and out ports 736, an ADB port 732, on/off button 754 and modem port 730.

DOCKING AND UNDOCKING

In the present invention, the computer and the docking station are coupled together using a mechanically triggered electromechanical docking/undocking mechanism. If this docking were to occur while either one of the docking station or the computer is in an active "on" condition, transient signals and voltages could destroy components and data could be corrupted and lost. The present invention incorporates numerous safety features which either prevent the docking/undocking of active units or, if such active docking/undocking can not be prevented, minimize the chances of damaging components and/or losing data.

The normal sequence for inserting the portable computer into the docking station begins with the portable computer off and the docking station off. When the portable computer is inserted, its EverWatch microcontroller 260 detects the attempted docking by means of a sense pin in the 152-pin connector. Once it detects docking, controller 260 waits for the on/off button on the docking station or the 'on' key on the keyboard to be pressed. Once an 'on' signal is received, the computer is first powered up but MSC 207 is held in a reset mode, which in turn maintains the expansion bus in a quiescent state and keeps CPU 201 powered off. The EverWatch microcontroller 260 drives a power fail warning signal high, which turns on power supply 522 in the docking station. Microcontroller 260 waits until a +5 V Ext_Sense line goes high, which indicates that power has stabilized in docking station 500. Microcontroller 260 then takes MSC 207 out of its reset mode, allowing CPU 201 to be powered up. During this normal docking, the signal provided by clamshell switch 101 (see FIG. 4) is ignored by microcontroller 260. It should be noted that whenever motor 631 is running, PAL 690 generates a power failure warning signal which shuts off power supply 522. This guarantees that the docking station will be powered down during any docking attempt. Normal computer operations follow this initial power-up stage.

A request to eject portable computer 100 from docking station 500 can be received at any time. In the most complex case, the computer and docking station are both operating and performing some task such as word processing. If the user presses the eject button while the system is in this state, the button causes a level 2 interrupt to be sent to CPU 201. The interrupt service routine which occurs in response to the interrupt calls the "docking manager" in ROM 205 which uses control and status calls from the configuration ROM 706 in the docking station to determine the validity of the eject request by reading MSC 207 and VSC 712. The docking manager also checks VSC 712 to determine if the docking station is locked. If it is locked, a dialog box is displayed on the video monitor indicating that ejection cannot take place because the system is locked. If the system is not locked, the docking manager, along with configuration ROM 706, clears the interrupt request, issues a software request to the operating system to shutdown, and sets the eject enable bit in VSC 712, VSC 712 being coupled to PAL 690. Once the eject enable bit is on, the state machine in PAL 690 waits until power to the docking station goes off before ejecting the computer. Next, the operating system requests that application programs quit because of the ejection request. The user is provided with a dialog box if data or changes might be lost so that they can be saved, following which the application program quits. The operating system then signals EverWatch microcontroller 260 to perform a shut down. Microcontroller 260 resets MSC 207 which turns off CPU 201 and then turns off docking station 500 and computer 100 in sequence. PAL 690 detects that power has been shut off and signals motor assembly 630 to turn on and eject the computer.

If a manual ejection is performed when docking station 500 is still on, PAL 690 turns off the docking station's power before the connectors between the docking station and the portable computer can be disengaged. The mechanism used in the mechanical ejection raises hooks 638 to allow the user to manually separate the units. As this method of ejection can occur at any time and in an "uncontrollable" manner, orderly closing of applications and saving data cannot take place. However, by insuring that power is properly shut off, the present invention prevents damage to either the docking station or the portable computer. Once the hooks have been raised and the portable computer manually removed, PAL 690 turns on motor assembly 630 until the motor assembly returns to its ready state.

When the docking station is not locked, the worst scenario would be if an active computer 100 were to be docked to the docking station, regardless of whether or not the station was on. If this was allowed to occur, both the data in computer 100, as well as its circuitry could be damaged by voltage transients.

A first failsafe mechanism is latch switch 101 activated by latch 117 in computer 100. Anytime computer 100 is closed, latch switch 101 provides a signal to EverWatch microcontroller 260, which signal allows EverWatch microcontroller 260 and MSC 207 to begin and complete the process of placing the computer in a sleep mode. Docking operations are permitted in sleep mode because power to the CPU and other delicate circuits is cut off. In general, it is very difficult if not impossible to insert portable computer 100 into docking station 500 without computer 100 being completely closed and therefore in a sleep state.

If the user attempts to insert computer 100 into docking station 500 while computer 100 is in a sleep state, no damage occurs to the computer, but the system is inoperable. Once inserted and an 'on' signal received, computer 100 will power up both CPU 210 and docking station 500 as previously described. Although the hardware used in this first embodiment permits full operation of the system with the portable computer coming out of a sleep state, the first embodiment's operating software cannot compensate for the change in display screens. Therefore, once computer 100 detects that it has been coupled to a docking station and that it has just come from a sleep state, it immediately returns to sleep, saving data, turning off the docking station and immediately ejecting the computer from the docking station. Once ejected, when computer 100's "on" is pressed. LCD 110 will display a message requesting that the user order a full shutdown before attempting to dock the computer again.

In the extremely unlikely event that closing computer 100 did not result in switch 101 providing the proper signal to EverWatch microcontroller 260 to place computer 100 in sleep mode, the present invention has an extraordinary response to attempted insertions while the portable computer is still in a run mode. 152-pin 160 in computer 100 has several long pins, including a "sense" pin, a +19 V power pin, and a ground pin, which make contact with sockets in docking station 500's 152-pin connector 582 before the remaining short pins, which include the other power pins, are connected. The long sense pin informs MSC 207 that docking is occuring. If computer 100 is still on, MSC 207 immediately cuts power to CPU 201. Although this results in data stored in RAM 203 being lost, this is preferable to allowing transient voltages and currents to be applied to the circuitry of computer 100, which circuitry might be damaged. This loss of data would occur in any event, as the system could not continue to function when connected to a powered down docking station. After MSC 207 has cut power to CPU 201, EverWatch microcontroller 260 completes a graceful shutdown of computer 100. This shutdown process insures that computer 100 is in a known state prior to any attempt to restart or use the system. It should also be noted that one of the short pins in the 152-pin connector also acts as a sense pin, providing to computer 100 a reliable indication that the connectors have been completely mated. Only after EverWatch microcontroller 260 receives this signal will the power planes be turned on. This eliminates the arcing and pitting of the connectors that can occur when an unpowered line is mated with a powered one.

Although the present invention has now been explained with reference to a particular embodiment, it should be apparent to one skilled in the art that numerous changes and modifications may be made thereto without departing from the scope or spirit of the invention. Dynamic changes of the monitors, even if the portable computer is in a sleep mode, will be permitted in later embodiments of the present invention. For example, it is inherent in the described embodiment that the docking station can be expanded in numerous ways. These include providing the docking station with a hard disk storage unit or a CD-ROM drive. It is not inconceivable that the docking station could be equipped with a separate CPU for special situations. The portable computer in other embodiments will be powered by different types of batteries, necessitating changes in the EverWatch microcontroller. Other changes, modifications and applications of the invention will become apparent to one skilled in the art in view of this disclosure. Thus, the invention should be limited only in accordance with the appended claims.

What is claimed is:

1. A computing system comprising:

a portable computer comprising at least a central processing unit, *and* a system address/data bus coupled to the central processing unit[, random access memory coupled to the system bus, hard disk data storage coupled to the system bus, a liquid crystal display coupled to the system bus, a power controller coupled to the system bus, and a battery coupled to the power controller]; and a docking station detachably coupled [via electrical connector means] to the portable computer [to provide increased video display capability and increased data storage], the docking station comprising at least an electromechanical docking/undocking means including an electric motor assembly for mechanically and electrically docking and undocking the portable computer to and from the docking station[, floppy disk data storage means coupled through the electrical connector means to the system address/data bus for providing additional data storage when the portable computer is docked to the docking station, the electrical connector means coupled to the system address/data bus for displaying data from the portable computer on a cathode ray tube display when said portable computer is docked to the docking station,] and [a plurality of failsafe mechanisms] *means* disposed within the portable computer and the docking station and cooperatively interacting for protecting the portable computer and docking station from damage as docking and undocking occurs.

2. The computing system of claim 1 *wherein the docking station is detachably coupled to the portable computer via electrical connector means, and* wherein the electrical connector means comprises a docking connector allowing access to the portable computer's system address/data bus and a docking connector cover having a first position covering the docking connector and a second position uncovering the docking connector, the docking station further comprising a door block for detecting whether the docking connector cover is in the first position, said door block not permitting the portable computer to be docked to the docking station if the docking connector cover is in the first position, the door block permitting docking if the docking connector cover is in the second position.

3. The computing system of claim 2 wherein the docking station further comprises a lock means having an unlocked and locked position, the lock means preventing the portable computer from being removed from the docking station if it is docked to the station and the lock is in its locked position and the lock means preventing the portable computer from being docked to the docking station if lock is in locked position by turning off the electromechanical docking/undocking means.

4. The computing system of claim 1, wherein the [failsafe mechanisms include] *means includes* a first switch disposed internal to the portable computer and a latch disposed in a top cover assembly hingedly coupled to the portable computer, wherein when said top cover assembly is rotated to bear against said portable computer, said latch engages said first switch to signal a power management controller coupled to a main system controller further coupled to said system address/data bus that said central processor must enter a sleep state, thereby preventing transient voltages and currents on said system address/data bus when said portable computer is inserted into said docking station.

5. The computing system of claim 4, wherein the [failsafe mechanisms] *means* further [comprise] *includes* at least one elongated contact pin disposed within the docking connector of the portable computer for contacting at least one corresponding elongated socket disposed within the electromechanical docking/undocking means of the docking station, wherein said elongated contact pins contact the corresponding elongated sockets before a plurality of shorter contact pins contact a plurality of short sockets.

6. The computing system of claim 5, wherein the elongated contact pins comprise a first sense pin, a power pin, and a ground pin; if said portable computer is "on" when said first sense pin contacts the corresponding elongated socket, said sense pin causing the main system controller to turn off power to the central processing unit to prevent transient voltages and currents to exist within said portable computer.

7. The computing system of claim 4, wherein the [failsafe mechanisms] *means* further [comprise] *comprises* a second sense contact pin to provide a confirming signal that the portable computer is firmly docked within the docking station, said second sense pin being shorter that said first sense pin, whereafter said power management controller applies power to said main system controller and said central processing unit.

8. The computing system of claim 1 further comprising electronic docking/undocking initiation and reset means and electronic braking means coupled to the electric motor assembly within the electromechanical docking/undocking means for accurately positioning the portable computer within the docking station when the portable computer is docked and undocked.

9. The computing system of claim 8, wherein the electronic docking/undocking initiation and reset means comprises a photodetector unit mounted within a receiving opening interior to said docking station and electrically coupled to said electric motor assembly; when said portable computer is inserted beyond a first, begin-docking position in the receiving opening, the photocell unit signaling the electric motor assembly to start and move the portable computer to a second, finish-docking position.

10. The computing system of claim 8, wherein the electronic braking means comprises first, second, and third transistors and a diode coupled to the electric motor assembly to rapidly stop a rotating shaft within the electric motor assembly thereby stopping the portable computer substantially at the second, finish-docking position.

11. The computing system of claim 10, wherein first and second transistors comprise metal-oxide-semiconductor field effect transistors (MOSFETs) coupled source to gate and said third transistor comprises a bipolar transistor having its emitter coupled to the drain of said second MOSFET and its collector coupled to a ground reference, there being further a motor drive voltage applied to the source of said second MOSFET and a diode coupled between said drain of second MOSFET and the ground reference, wherein applying a stop-motor voltage to the gate of said first MOSFET turns off the second MOSFET thereby electrically decoupling the electric motor assembly from the motor drive voltage, whereafter residual motor drive voltage present in said motor assembly causes said bipolar transistor to discharge said residual voltage to ground and substantially stopping the rotating shaft.

12. The computing system of claim 8, wherein when said portable computer is ejected the docking/undocking initiation and reset means signals the electric motor assembly to start and move the portable computer from said second, finish-docking position to a third, finish-ejecting position substantially coincident with said first begin-docking position.

13. The computing system of claim 12, wherein when the portable computer reaches the third, finish-ejecting position, the photocell unit sends a motor-reset signal that causes the electric motor assembly to reset to a ready state.

14. A computing system comprising:

a portable computer comprising at least a central processing unit, a system address/data bus coupled to the central processing unit, random access memory coupled to the system bus, hard disk data storage coupled to the system bus, a liquid crystal display coupled to the system bus, a power controller coupled to the system bus, and a battery coupled to the power controller; and a docking station detachably coupled via electrical connector means to the portable computer to provide increased video display capability and increased data storage;

the electrical connector means comprising:

a docking connector allowing access to the portable computer's system address/data bus and a docking connector cover having a first position covering the docking connector and a second position uncovering the docking connector, the docking station further comprising a door block for detecting whether the docking connector cover is in the first position, said door block not permitting the portable computer to be docked to the docking station if the docking connector cover is in the first position, the door block permitting docking if the docking connector cover is in the second position;

the docking station comprising:

at least an electromechanical docking/undocking means including an electric motor assembly for mechanically and electrically docking and undocking the portable computer to and from the docking station, floppy disk data storage means coupled through the electrical connector means to the system address/data bus for providing additional data storage when the portable computer is docked to the docking station, the electrical connector means coupled to the system address/data bus for displaying data from the portable computer on a cathode ray tube display when said portable computer is docked to the docking station,

[a plurality of failsafe mechanisms] *means* disposed within the portable computer and the docking station and cooperatively interacting for protecting the portable computer and docking station from damage as docking and undocking occurs, and lock means disposed within said docking station for cooperatively securing insertion and removal of said portable computer from said docking station, said lock means having an unlocked position and a locked position, the lock means preventing the portable computer from being removed from the docking station if the portable computer is docked to the station and the lock means is in the locked position, said lock means further preventing the portable computer from being docked on the docking station when the portable computer is not docked to the station and said lock means is in the locked position by turning off the electromechanical docking/undocking means.

15. A portable computer and docking station wherein the portable computer is usable without being docked to the docking station and when docked to the docking station has increased data storage capabilities and increased video display capabilities, the portable computer comprising a central processing unit;

a system bus for transmitting data and instructions coupled to the central processing unit;

random access memory coupled to the system bus;

liquid crystal display coupled to the system bus;

main system controller coupled to the system bus;

power controller coupled to the main system controller for controlling power usage in the portable computer and for controlling battery charging;

keyboard coupled to the power controller;

read only memory for storing system instructions coupled to the system bus; and first docking connector coupled to the system bus and power controller; and the docking station comprising:

second docking connector for connecting to the first docking connector and allowing access to the portable computer's system bus;

electromechanical docking/undocking means including an electric motor assembly for electrically and mechanically coupling the first and second docking connectors together once the portable computer has been placed into the docking station;

docking station address and data bus coupled to the second docking connector;

video display system coupled to the docking station bus for display data processed in the portable computer on a cathode ray tube display;

on input/output (I/O) bus subsystem and protocol controller coupled to the docking station bus for allowing installation and use of I/O bus subsystem extension cards in the docking station;

floppy disk drive coupled to the docking station bus for allowing access to data stored on floppy disks by the portable computer when the portable computer is docked to the docking station; and a plurality of electromechanical docking/undocking safety interlocks disposed within the portable computer and the docking station and cooperatively interacting for preventing the docking and undocking of the portable computer to and from the docking station if such docking and undocking would damage components in the docking station and the portable computer and cause the loss of data stored in the portable computer and the docking station.

16. The portable computer and docking station of claim 15 wherein the portable computer further comprises a docking connector door which has a first position covering the first docking connector and a second position uncovering the first docking connector and the docking station further comprises a door block that prevents docking of the portable computer when the door is in its first position and permits docking when the door is in its second position.

17. The portable computer and docking station of claim 16 wherein the docking station further comprises a locking means having a locked and unlocked position, the locking means preventing the portable computer from being docked to the docking station if the locking means is in its locked position by preventing the electromechanical docking/undocking means from turning on to dock the portable computer and the locking means preventing the portable computer from being removed from the docking station ashen the locking means is in its locked position.

18. The docking station of claim 15, wherein the safety interlocks include a first switch disposed internal to the portable computer and a latch disposed in a top cover assembly hingedly coupled to the portable computer, wherein when said top cover assembly is rotated to bear against said portable computer, said latch engages said first switch to signal the power controller coupled to said system address/data bus that said central processor must enter a sleep state, thereby preventing transient voltages and currents on said system address/data bus when said portable computer is inserted into said docking station.

19. The computing system of claim 18, wherein the safety interlocks further comprise at least one elongated contact pin disposed within the docking connector of the portable computer for contacting at least one corresponding elongated socket disposed within the electromechanical docking/undocking means of the docking station, wherein said elongated contact pins contact the corresponding elongated sockets before a plurality of shorter contact pins contact a plurality of short sockets.

20. The computing system of claim 19, wherein the elongated contact pins comprise a first sense pin, a power pin, and a ground pin; when said first sense pin contacts the corresponding elongated socket said sense pin informing the main system controller terminating power to the central processing unit to prevent transient voltages and currents to exist within said portable computer.

21. The computing system of claim 19, wherein the safety interlocks further comprise a second sense contact pin to provide to the power management controller a confirming signal that the portable computer is firmly docked within the docking station, said second sense pin being shorter that said first sense pin, whereafter said power management controller applies power to said main system controller and said central processing unit.

22. The computing system of claim 15 further comprising electronic docking/undocking initiation and reset means and electronic braking means coupled to the electric motor assembly within the electromechanical docking/undocking means for accurately positioning the portable computer within the docking station when the portable computer is docked and undocked.

23. The computing system of claim 22, wherein the electronic docking/undocking initiation and reset means comprises a photodetector unit mounted within a receiving opening interior to said docking station and electrically coupled to said electric motor assembly; when said portable computer is inserted beyond a first, begin-docking position in the receiving opening, the photocell unit signaling the electric motor assembly to start and move the portable computer to a second, finish-docking position.

24. The computing system of claim 22, wherein the electronic braking means comprises first, second, and third transistors and a diode coupled to the electric motor assembly to rapidly stop a rotating shaft within the electric motor assembly thereby stopping the portable computer substantially at the second, finish-docking position.

25. The computing system of claim 24, wherein first and second transistors comprise metal-oxide-semiconductor field effect transistors (MOSFETs) coupled source to gate and said third transistor comprises a bipolar transistor having its emitter coupled to the drain of said second MOSFET and Its collector coupled to a ground reference, there being further a motor drive voltage applied to the source of said second MOSFET and a diode coupled between said drain of second MOSFET and the ground reference, wherein applying a stop-motor voltage to the gate of said first MOSFET turns the second MOSFET off thereby electrically decoupling the electric motor assembly from the motor drive voltage, whereafter residual motor drive voltage present in said motor assembly causes said bipolar transistor to discharge said residual voltage to ground and stopping the rotating shaft.

26. The computing system of claim 22, wherein when said portable computer is ejected the docking/undocking initiation and reset means signals the electric motor assembly to start and move the portable computer from said second, finish-docking position to a third, finish-ejecting position substantially coincident with said first begin-docking position.

27. The computing system of claim 26, wherein when the portable computer reaches the third, finish-ejecting position, the photocell unit sends a motor-reset signal that causes the electric motor assembly to reset to a ready state.

28. A portable computer and docking station wherein the portable computer is usable without being docked to the docking station and when docked to the docking station has increased data storage capabilities and increased video display capabilities;

the portable computer comprising:

a central processing unit;

a system bus for transmitting data and instructions coupled to the central processing unit;

a random access memory coupled to the system bus;

a liquid crystal display coupled to the system bus;

a main system controller coupled to the system bus;

a power controller coupled to the main system controller for controlling power usage in the portable computer and for controlling battery charging;

a keyboard coupled to the power controller;

a read only memory for storing system instructions coupled to the system bus;

a first docking connector coupled to the system bus and power controller;

a docking connector door having a first position covering the first docking connector and a second position uncovering the first docking connector;

the docking station comprising:

a second docking connector for connecting to the first docking connector and allowing access to the portable computer's system bus;

a docking connector door block disposed on said docking station for preventing docking of the portable computer when the docking connector door is in the first position, said docking connector door block further permitting docking of the portable computer when the docking connector door is in the second position;

electromechanical docking/undocking means including an electric motor assembly for electrically and mechanically coupling the first and second docking connectors together after the portable computer has been placed into the docking station:

a docking station address and data bus coupled to the second docking connector;

video display system coupled to the docking station bus for display data processed in the portable computer on a cathode ray tube display;

an input/output (I/O) bus subsystem and protocol controller coupled to the docking station address and data bus for allowing installation and use of I/O bus subsystem expansion cards in the docking station;

a floppy disk drive coupled to the docking station address and data bus for allowing access to data stored on floppy disks by the portable computer when the portable computer is docked to the docking station;

a plurality of electromechanical docking/undocking safety interlocks disposed within the portable computer and the docking station and cooperatively interacting for preventing the docking and undocking of the portable computer to and from the docking station if such docking and undocking would damage components in the docking station and the portable computer and cause loss of data stored in the portable computer and the docking station, and locking means for cooperatively securing insertion and removal of said portable computer from said docking station, the locking means preventing the portable computer from being docked to the docking station if the locking means is in the locked position by preventing the electromechanical docking/undocking means from turning on to dock the portable computer, said locking means further preventing the portable computer from being removed from the docking station when the portable computer is docked to the station and said lock means is in the locked position.

*29. A computer system comprising:*

*a portable computer comprising at least a central processing unit, and a system address/data bus coupled to the central processing unit;*

*a docking station detachably coupled via at least one electrical connector to the portable computer, the docking station comprising at least an electromechanical docking/undocking means including an electric motor assembly for mechanically and electrically docking and undocking the portable computer to and from the docking station; and*

*cooperative means disposed in the docking station cooperatively interacting with the portable computer for protecting the portable computer and the docking station from electrical damage as docking and undocking occurs.*

*30. The computer system of claim 29 wherein the cooperative means includes a first sense contact adapted for correspondingly mating with a second sense contact disposed in the portable computer for providing a confirming signal that the portable computer is firmly docked to the docking station.*

*31. The computer system of claim 30 wherein the cooperative means further includes a third sense contact adapted for correspondingly mating with a fourth sense contact disposed in the portable computer for providing an electrical connection between the portable computer and the docking station; as docking occurs, this electrical connection is made earlier than the electrical connection made between the first and the second sense contacts.*

*32. The computer system of claim 31 wherein the first sense contact includes at least one electrical socket for matingly receiving the second sense contact, wherein the second sense contact includes at least one contact pin.*

*33. The computer system of claim 32 wherein the third sense contact includes at least one electrical socket for matingly receiving the fourth sense contact, wherein the fourth sense contact includes at least one contact pin longer in length than that of the at least one contact pin of the second sense contact.*

*34. The computer system of claim 31 wherein the third sense contact makes the electrical connection with the fourth sense contact as the portable computer docks with the*

*docking station; if the portable computer is "on" when the electrical connection is made, the electrical connection causing power to at least a portion of the portable computer be turned off to prevent electrical damage.*

*35. A docking station comprising:*

*a computer receiving area capable of receiving a personal computer;*

*electromechanical docking/undocking means for mechanically and electrically docking and undocking the portable computer to and from the computer receiving area of the docking station; and*

*cooperative means disposed in the docking station cooperatively interacting with the portable computer for protecting the portable computer and the docking station from electrical damage as docking and undocking occurs.*

*36. The docking station of claim 35 wherein the electromechanical docking/undocking means includes an electric motor assembly.*

*37. The docking station of claim 36 wherein the electromechanical docking/undocking means comprises a sensor assembly being electrically coupled to the electric motor assembly; when the portable computer is moved into the computer receiving area of the docking station beyond a begin-docking position, the sensor assembly signaling the electric motor assembly to start and move the portable computer to a finish-docking position for operative engagement with the docking station.*

*38. The docking station of claim 37 wherein the electromechanical docking/undocking means in response of a eject signal causes the electric motor assembly to start and move the portable computer from the finish-docking position to a finish-ejecting position substantially coincident with the begin-docking position.*

*39. The docking station of claim 38 further comprising electronic braking means coupled to the electric motor assembly to rapidly stop a rotating shaft within the electric motor assembly whereby stopping the portable computer substantially at the begin-docking position.*

*40. The docking station of claim 38 wherein the sensor assembly sends a motor-reset signal that causes the electric motor assembly to operate to return the portable computer to the begin-docking position after the portable computer is ejected from the docking station and has reached the finish-ejecting position.*

*41. The docking station of claim 35 being coupleable via electrical connector means to the portable computer, wherein the electrical connector means comprising a docking connector allowing electrical access to the potable computer and a docking connector cover having a first position covering the docking connector and a second position uncovering the docking connector the docking station further comprising a door position, sensor for detecting whether the docking connector cover is in the first position, the door position sensor not permitting the portable computer to be docked to the docking station if the docking connector cover is in the first position, the door position sensor permitting docking if the docking connector cover is in the second position.*

*42. The docking station of claim 35 further comprising lock means having an unlocked and locked position, the lock means preventing the portable computer from being removed from the docking station if the portable computer is docked to the docking station and the lock means is in its locked position and the lock means preventing the portable computer from being docked to the docking station if the lock means is in the locked position.*

*43. The docking station of claim 42 wherein the lock means causes the electromechanical docking/undocking means to be turned off when the portable computer is attempting to dock the docking station while the lock means is in the locked position.*

*44. The docking station of claim 35 being adapted for removably coupling the portable computer to peripheral devices external to the portable computer, the docking station further comprising data I/O controller means for interacting and cooperating with the portable computer.*

*45. The docking station of claim 44 wherein the data I/O controller means includes video display controller means operating cooperatively with the portable computer.*

*46. The docking station of claim 45 wherein the video display controller means supports at least one display device for displaying data received from the portable computer while the portable computer is docked to the docking station.*

*47. The docking station of claim 44 wherein the data I/O controller means includes data storage controller means operating cooperatively with the portable computer.*

*48. The docking station of claim 47 wherein the data storage controller means supports at least one data storage unit.*

*49. The docking station of claim 48 wherein the at least one data storage unit operates on a magnetic medium.*

*50. The docking station of claim 49 wherein the at least one data storage unit includes a floppy disk drive internal to the docking station, the floppy disk drive being coupled to the portable computer for providing additional data storage for the portable computer while the portable computer is docked to the docking station.*

*51. The docking station of claim 44 wherein the data I/O controller means includes data communications controller means operating cooperatively with the portable computer.*

*52. The docking station of claim 51 wherein the data communications controller means supports at least a communications protocol used for data transmission and data reception while the portable computer is docked to the docking station.*

*53. A method for operatively coupling a portable computer to a peripheral device external to the portable computer, the method comprising:*

*providing a docking station including the peripheral device and at least one electromechanical docking/undocking means having an electric motor assembly for mechanically and electrically docking and undocking the portable computer to and from the docking station, and a receiving area structure adapted for receiving the portable computer for docking;*

*manually positioning the portable computer beyond a begin-docking position in the receiving area structure;*

*operating the electromechanical docking/undocking means to drive the manually positioned portable computer for operative engagement with the peripheral device in the docking station, said operating including sensing whether the portable computer is "on" as docking occurs, and controlling the portable computer to ensure no electrical damage occurring as the portable computer docks with the docking station.*

*54. The method of claim 53 wherein the controlling includes turning off the power to at least a portion of the portable computer if the portable computer is "on" when docking occurs.*

*55. The method of claim 54 wherein the at least a portion of the portable computer includes a central processing unit.*

*56. A method for operatively coupling a portable computer to a peripheral device external to the portable computer, the method comprising:*

*providing a docking station including the peripheral device and at least one electromechanical docking/undocking means having an electric motor assembly for mechanically and electrically docking and undocking the portable computer to and from to the docking station, and a receiving area structure adapted for receiving the portable computer for docking;*

*manually positioning the portable computer beyond a begin-docking position in the receiving area structure; and*

*operating the electromechanical docking/undocking means to drive the manually positioned portable computer for operative engagement with the peripheral device in the docking station, said operating including sensing whether the portable computer is firmly docked to the docking station, and turning on the power to the portable computer when the portable computer is firmly docked to the docking station.*

* * * * *